US009483146B2

(12) United States Patent  (10) Patent No.: US 9,483,146 B2
Davidson et al.  (45) Date of Patent: Nov. 1, 2016

(54) INPUT CLASSIFICATION FOR MULTI-TOUCH SYSTEMS

(71) Applicant: Perceptive Pixel, Inc., New York, NY (US)

(72) Inventors: Philip L. Davidson, New York, NY (US); Jefferson Y. Han, Holliswood, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 47 days.

(21) Appl. No.: 13/654,391

(22) Filed: Oct. 17, 2012

(65) Prior Publication Data

US 2014/0104225 A1  Apr. 17, 2014

(51) Int. Cl.
*G06F 3/044* (2006.01)
*G06F 3/0488* (2013.01)
*G06F 3/041* (2006.01)

(52) U.S. Cl.
CPC ............. *G06F 3/044* (2013.01); *G06F 3/0416* (2013.01); *G06F 3/0488* (2013.01)

(58) Field of Classification Search
CPC ...... G06F 3/041; G06F 3/044; G06F 3/0416; G06F 3/04883; G06F 2203/04108; G06F 2203/04104
See application file for complete search history.

(56) References Cited

U.S. PATENT DOCUMENTS 8,384,684 B2  2/2013  Westerman
8,773,390 B1 *  7/2014  Clark .................. G06F 3/045
                                                        345/156
2009/0095540 A1 *  4/2009  Zachut et al. ............. 178/18.03
2009/0283342 A1  11/2009  Schediwy et al.
2010/0053095 A1  3/2010  Wu et al.
2011/0291944 A1 *  12/2011  Simmons et al. ............. 345/173
2012/0075246 A1  3/2012  Chang et al.
2012/0105361 A1  5/2012  Kremin et al.
2012/0262407 A1  10/2012  Hinckley et al.
2013/0009907 A1  1/2013  Rosenberg et al.
2013/0328832 A1 *  12/2013  Boumgarten ................. 345/174
2014/0002407 A1 *  1/2014  Badaye et al. ................ 345/174

OTHER PUBLICATIONS

"The N-trig Approach to Multi-Touch: DuoSense", Hands-on computing, N-trig, http://www.n-trig.com/Data/Uploads/Misc/N-trig_Paper_on_Multi-Touch_2008.pdf, Dec. 24, 2008, 16 pages.

(Continued)

*Primary Examiner* — Jonathan Boyd
*Assistant Examiner* — Sardis Azongha
(74) *Attorney, Agent, or Firm* — Brandon Roper; Judy Yee; Micky Minhas

(57) ABSTRACT

Methods, systems, and apparatus, including computer programs encoded on a computer storage medium, for input classification for multi-touch systems. In one aspect, a method includes receiving data describing a first region of contact with a touch sensitive display and a second region of contact with the touch sensitive display. The method includes determining at least one characteristic of the first region of contact. The method includes based on the at least one characteristic of the first region of contact, determining that the first region of contact corresponds to intended touch input provided by a user's body part or stylus. The method includes determining at least one characteristic of the second region of contact. The method includes based on the at least one characteristic of the second region of contact, determining that the second region of contact corresponds to incidental touch input provided by a user's resting body part.

16 Claims, 17 Drawing Sheets

(56) References Cited

OTHER PUBLICATIONS

Hoy, M., "Microsoft Courier's Stylus: The Pen That's Mightier Than the IPad", Yahoo! Voices, http://voices.yahoo.com/microsoft-couriers-stylus-pen-thats-mightier-than-5626162.html, Mar. 11, 2010, 2 pages.

Stern, J., "Samsung Introduces the Galaxy Note 2: The Stylus Stays, Screen Super-Sized", ABC News, http://abcnews.go.com/Technology/samsung-galaxy-note-stylus-stays-screen-super-sized/story?id=17096023, Aug. 29, 2012, 3 pages.

* cited by examiner

INPUT CLASSIFICATION FOR MULTI-TOUCH SYSTEMS

TECHNICAL FIELD

This disclosure relates to classifying inputs on a multi-touch display device.

BACKGROUND

Multi-touch display devices often adopt many of the characteristics of touch-screen display devices, and yet they are generally more sophisticated than traditional touch-screen display devices in that they are capable of detecting the presence and location of multiple touches on, within, or within the vicinity of the surface of the display area at the same time. Specifically, multi-point input computing systems receive, recognize, and act upon multiple inputs at the same time. Because multi-point input computing systems are capable of receiving, recognizing, and acting upon multiple inputs at the same time, multi-point input computing systems may enable multiple users to interact with individual systems at the same time, thereby providing for collaboration between the multiple users.

Like traditional touch-screen display devices, some multi-touch display devices require that a user physically touch the surface of the display area with one or more fingers, styluses, and/or other mechanisms in order to engage the surface of the multi-touch display device, while other multi-touch display devices are capable of receiving input by detecting that one or more fingers, styluses, and/or other input mechanisms have engaged the surface of the multi-touch display device by hovering around, or otherwise in the vicinity of, the surface of the display area without requiring that the input mechanism actually make physical contact with the surface of the touch-screen display device.

SUMMARY

According to an innovative aspect of the subject matter described in this specification may be embodied in methods that include the actions of receiving data describing a first region of contact with a touch sensitive display and a second region of contact with the touch sensitive display; determining at least one characteristic of the first region of contact; based on the at least one characteristic of the first region of contact, determining that the first region of contact corresponds to intended touch input provided by a user's body part or stylus; determining at least one characteristic of the second region of contact; based on the at least one characteristic of the second region of contact, determining that the second region of contact corresponds to incidental touch input provided by a user's resting body part; and based on the determination that the first region of contact corresponds to intended touch input and the second region of contact corresponds to incidental touch input, updating the touch sensitive display by responding to the first region of contact as touch input while ignoring the second region of contact.

These and other embodiments can each optionally include one or more of the following features. The action of determining the at least one characteristic of the first region of contact further includes determining a first area of the first region of contact. The action of determining that the first region of contact corresponds to intended touch input further includes determining that the first region of contact corresponds to intended touch input based on the first area of the first region of contact. The action of determining the at least one characteristic of the second region of contact further includes determining a second area of the second region of contact. The action of determining that the second region of contact corresponds to incidental touch input further includes determining that the second region of contact corresponds to incidental touch input based on the second area of the second region of contact.

The action of determining that the first region of contact corresponds to intended touch input based on the first area of the first region of contact includes comparing the first area of the first contact region to a threshold; based on comparing the first area of the first contact region to the threshold, determining that the first area is less than the threshold; and based on the determination that the first area is less than the threshold, determining that the first region of contact corresponds to intended touch input. The action of determining that the second region of contact corresponds to incidental touch input based on the second area of the second region of contact includes comparing the second area of the second contact region to the threshold; based on comparing the second area of the second contact region to the threshold, determining that the second area is greater than the threshold; and based on the determination that the second area is greater than the threshold, determining that the second region of contact corresponds to incidental touch input.

The action of determining the at least one characteristic of the second region of contact further includes determining an ellipse that surrounds the second region of contact, the ellipse having a major axis and a minor axis. The action of determining that the second region of contact corresponds to incidental touch input further includes determining that the second region of contact corresponds to incidental touch input based on the determined ellipse.

The action of determining that the second region of contact corresponds to incidental touch input based on the determined ellipse further includes determining a ratio of the major axis of the ellipse to the minor axis of the ellipse; comparing the determined ratio to a threshold; based on comparing the determined ratio to the threshold, determining that the determined ratio is greater than the threshold; and based on the determination that the determined ratio is greater than the threshold, determining that the second region of contact corresponds to incidental touch input.

The action of determining the at least one characteristic of the second region of contact further includes determining a capacitance corresponding to the second region of contact. The action of determining that the second region of contact corresponds to incidental touch input further includes determining that the second region of contact corresponds to incidental touch input based on the determined capacitance. The action of determining that the second region of contact corresponds to incidental touch input based on the determined capacitance further includes comparing the determined capacitance of the second contact region to a threshold; based on comparing the determined capacitance of the second contact region to the threshold, determining that the capacitance is greater than the threshold; and based on the determination that the capacitance is greater than the threshold, determining that the second region of contact corresponds to incidental touch input.

The action of determining the at least one characteristic of the second region of contact includes determining a perimeter corresponding to the second region of contact; and determining an area corresponding to the second region of contact. The action of determining that the second region of contact corresponds to incidental touch input further includes determining that the second region of contact corresponds to incidental touch input based on the determined perimeter and the determined area.

The action of determining that the second region of contact corresponds to incidental touch input based on the determined perimeter and the determined area further includes determining a ratio of the determined perimeter to the determined area; comparing the determined ratio to a threshold; based on comparing the determined ratio to the threshold, determining that the determined ratio is greater than the threshold; and based on the determination that the determined ratio is greater than the threshold, determining that the second region of contact corresponds to incidental touch input.

The action of determining that the second region of contact corresponds to incidental touch input further includes determining an area of the second region of contact; determining an ellipse that surrounds the second region of contact, the ellipse having a major axis and a minor axis; determining a first ratio of the major axis of the ellipse to the minor axis of the ellipse; determining a capacitance corresponding to the second region of contact; determining a perimeter corresponding to the second region of contact; determining a second ratio of the determined perimeter to the determined area of the second region of contact; and determining that the second region of contact corresponds to incidental touch input based on the determined area of the second region of contact, the first ratio of the major axis of the ellipse to the minor axis of the ellipse, the capacitance corresponding to the second region of contact, and the second ratio of the determined perimeter to the determined area of the second region of contact.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
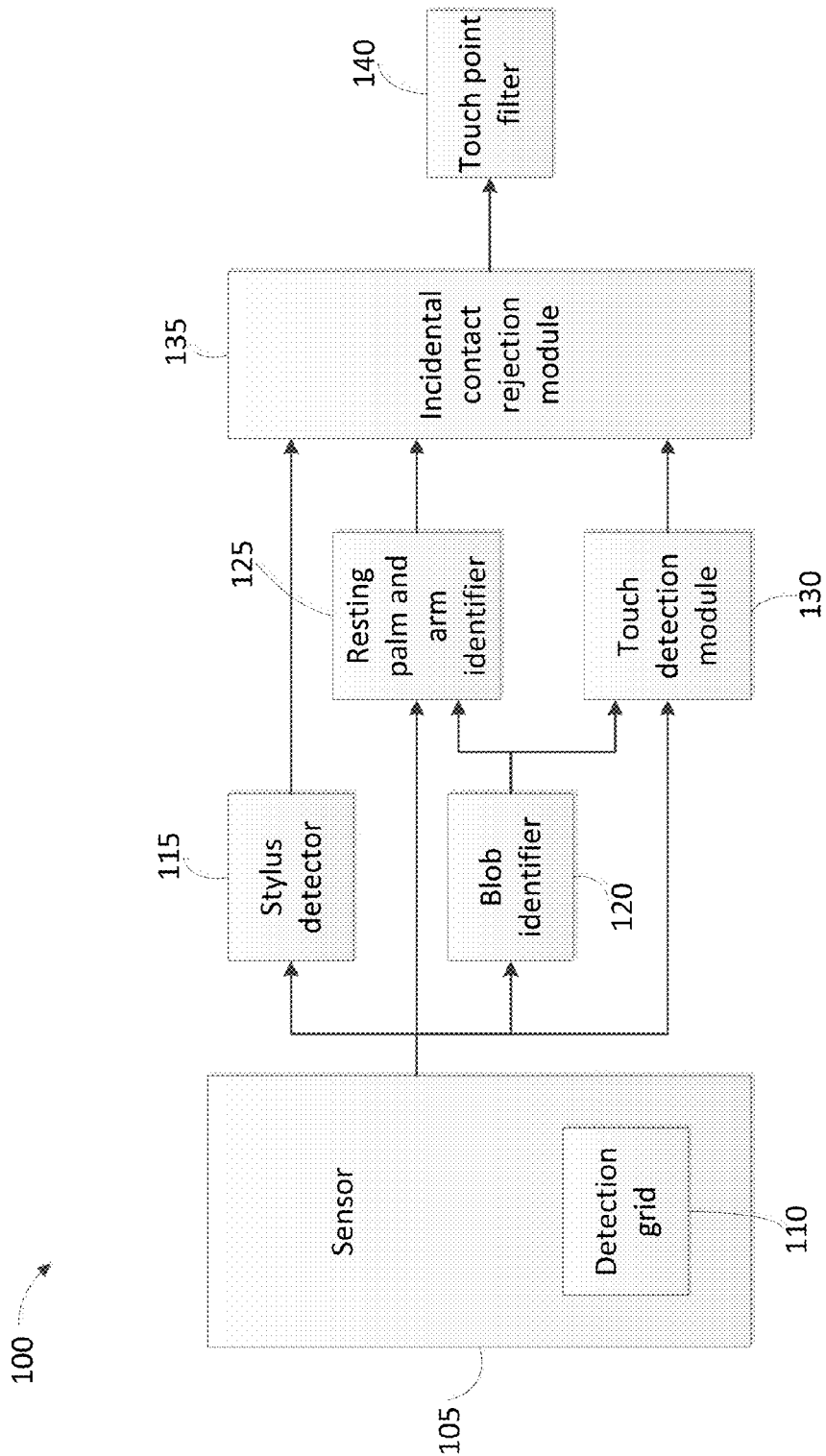
FIG. 1 is an overall system diagram of an input classification system on a multi-touch display device.

A multi-touch display system distinguishes between two types of user inputs: (1) user inputs or touches that are intended by the user to control the operation of an application of the multi-touch display system, which are referred to as "intended touches"; and (2) user inputs or touches that are incidental to the intended touches and are not intended by the user to control the operation of the application, which are referred to as "incidental touches." For example, when interacting with a stylus writing/drawing application, a user may rest his palm and forearm on a touch-sensitive surface of the multi-touch display system while using a stylus to write or draw on the touch-sensitive surface, and simultaneously using his fingers to move and reposition elements on the surface. The finger touches, and the input provided by the stylus tip are intended touches in that the user intends that the fingers reposition the page, and that the stylus tip input control the operation of the stylus writing/drawing application to cause visible lines to appear on the display of the multi-touch display device in response to the user writing or drawing with the stylus on the touch-sensitive surface. In contrast, the touch or input provided by the user's palm and forearm are incidental to the intended stylus tip input and fingertips, therefore, are not intended by the user to move or reposition the page, or to control the operation of the stylus writing/drawing application to cause visible lines to appear as the user moves the palm and forearm across the touch-sensitive surface.

The techniques described below determine or infer user intent behind inputs or touches and, thereby, allow applications executed by the multi-touch display device to, for example, respond to intended touches or inputs while ignoring incidental touches or inputs. Inferring user intent behind touches or inputs may include distinguishing between resting body part inputs and pointing inputs. Resting body part inputs are inputs corresponding to large and irregular, contiguous, contact regions on the touch-sensitive surface that typically result from relatively large body parts resting on the touch-sensitive surface (e.g., an elbow, a forearm or a palm resting on the touch-sensitive surface). Pointing inputs, in contrast, are inputs corresponding to smaller and more circular or elliptical, contiguous, contact regions that typically result from a pointing input mechanism, such as a pointing finger tip or a stylus tip, engaging the touch-sensitive surface. A resting body part input is likely an incidental touch because it typically is not intended by the user to trigger or exercise control over the application of the multi-touch display device. In contrast, a pointing input may be an incidental touch or, alternatively, may be an intended touch depending on its characteristics and relationship to other inputs. Determining whether a particular pointing input is an intended touch rather than an incidental touch may involve further processing by the system.

The further processing may include, for example, performing one or more of a stylus or pen occlusion analysis, a palm adjacent analysis, and a guide finger identification analysis. The stylus or pen occlusion analysis determines whether the pointing input is likely the result of a dropped finger of the user's writing hand engaging the touch-sensitive surface while the user is writing with a stylus. A pointing input that is determined to be likely the result of a dropped finger is likely an incidental touch.

The palm adjacent point analysis determines whether the pointing input is within a short distance (e.g., ¼ of an inch) from a large, resting body part input (e.g., a palm input). If the pointing input is within the short distance, then the pointing input is likely an incidental touch.

The guide finger identification analysis determines whether the pointing input is likely the result of a guide finger touching the touch-sensitive surface that is used by the user to guide his or her hand while writing or drawing on the touch-sensitive surface using, for example, a stylus. A pointing input determined to be likely the result of a guide finger touching the touch-sensitive surface is likely an incidental touch.

FIG. 1 is a block diagram of an example touch classification system 100 for a multi-touch display system that distinguishes between intended and incidental touches. The touch classification system 100 includes a sensor 105 that includes a detection grid 110 composed of a set of detection points. The sensor 105 is configured to detect user input when the user engages or contacts the detection grid 110 using one or more input mechanisms and then provide corresponding engagement data that enables identification of the locations of the user inputs on the detection grid 110. In some implementations, the detection grid 110 is positioned over the display of the multi-touch display system to thereby form a touch screen system. In other implementations, the detection grid 110 is separate from the display to thereby form a touchpad system. The touch classification system 100 further includes a stylus detector 115 that, alone or in conjunction with the detection grid 110 or with a different and independent second detection grid, is configured to detect user stylus input and to produce corresponding stylus engagement data that enables identification of the location of the stylus tip on the detection grid 110. The system 100 further includes various modules used to process the engagement data generated by the sensor 105 and/or the stylus detector 115 and which may be implemented, for example, by one or more processors or circuits that are integrated within or separated from but in communication with the sensor 105 and/or the stylus detector 115.

Specifically and as described in more detail below, the system 100 includes a blob identifier 120 configured to identify blobs based on the engagement data produced by the sensor 105. Blobs are, regions of contiguous user contact (or engagement) on the detection grid 110. In some implementations, a blob may be represented by data identifying a subset of the detection points of the detection grid 110, where each of the detection points in the subset is a point that is in contact (or engaged) with a user input mechanism (i.e., user contact) and is positioned in the grid 110 adjacent to another such contacted point in the subset (i.e., contiguous). The system 100 includes a resting palm and arm identifier 125 configured to determine which of the blobs identified by the blob identifier 120 likely correspond to resting body part inputs, and a touch detection module 130 configured to identify which of the blobs identified by the blob identifier 120 likely correspond to pointing inputs. The incidental contact rejection module 135 is configured to receive inputs from the stylus detector 115, the resting palm and arm identifier 125 and the touch detection module 130 and process the inputs to provide estimates that indicate a likelihood that a blob corresponds to an intended touch (versus an incidental touch) based on various different analyses.

The touch point filter 140 is configured to receive from the incidental contact rejection module 135 the estimate data and may process the estimate data to determine an aggregate likelihood that a particular blob corresponds to an incidental touch or instead corresponds to an intended touch. In some implementations, the touch filter 140 may process the estimate data to make a binary decision regarding whether a given blob corresponds to an intended touch (e.g., by comparing one or more confidence estimates or scores received from the module 135 for the blob to a predetermined threshold and concluding that the blob corresponds to an intended touch if the one or more confidence scores exceed the threshold). The touch filter 140 may then only send data associated with those blobs determined to correspond to intended touches to an application of the multi-touch display system for further processing.

In some implementations, the touch filter 140 may provide data for all detected blobs to the application and may supplement this data with additional data that identifies which blobs have been determined by the touch filter 140 to correspond to intended touches and which blobs have been determined by the touch filter 140 to correspond to incidental touches. Additionally or alternatively, the touch filter 140 may provide data to the application for all detected blobs and provide one or more additional probability values associated with each blob that indicate the likelihood that the blob corresponds to an intended touch (e.g., a value between zero and 1, where a value of 1 indicates that the blob definitely corresponds to an intended touch and a value of zero indicates that the blob definitely corresponds to an incidental touch). The application may then process this additional data to make its own determination regarding which blobs correspond to intended versus incidental touches and how to respond to such touches.

Each of the components of system 100 will now be described in more detail. As noted previously, the sensor 105 may receive input from the user through the user contacting, touching, or, more generally, engaging the detection grid 110.

The detection grid 110 may be made up of an array of detection points distributed over a two-dimensional sensing area. In some implementations, the detection points are evenly distributed in two dimensions over the sensing area. In this instance, the detection grid 110 may be shaped like a square or a rectangle, depending on whether the number of horizontal detection points equals the number of vertical detection points. In other implementations, the detection grid 110 may be shaped like a parallelogram. Each detection point in the detection grid 110 may receive input directly from one or more user input mechanisms (e.g., a user finger and/or a stylus) interacting with the multi-touch display. Detection points can be, for example, capacitive-based or FTIR-based. Measurements may be generated for each detection point, and, in some implementations, a measurement value may be produced for each detection point in the grid 110, irrespective of whether that detection point is or is not currently being engaged by the user. Notably, when there is no user engagement with a detection point, the measurement value for the detection point may be set to a zero value or to whatever value has been assigned by the system 100 as corresponding to no touch (i.e., a baseline value). As previously stated, in some implementations, direct physical contact between an input mechanism and the grid 110 may not be required to generate a touch. For example, in some implementations, if an input mechanism is hovering over the detection grid 110 (e.g., within 10 mm of the surface of the grid 110), the sensor 105 may detect a small change in capacitance or other measurable characteristic of the grid 110 at the detection points under the hovering input mechanism and may identify the existence of a touch by the input mechanism at the location of these detection points based on this detected small change.

In one implementation, the sensor 105 may be a capacitive touch sensor that includes circuitry to determine the locations of user inputs on the detection grid 110 by detecting changes in conductor capacitances caused by the one or more input mechanisms used by the user to engage the detection grid 110. The detection grid 110 may, for example, be a sensor matrix made up of a first group of conductors that are positioned substantially parallel to each other and a second group of conductors that are positioned substantially parallel to each other, where each of the conductors in the first array is positioned to intersect with every conductor in the second array and, vice versa, to thereby form a matrix. Each of the intersections between a conductor in the first array and a conductor in the second array may be a detection point of the grid 110. Through use of interpolation techniques, the number of detection points in the grid 110 may exceed the number of conductor intersections and the pitch of the detection points may be greater than the pitch of the conductor intersections.

The one or more user input mechanisms may, for example, be fingers or styluses and may engage the detection grid 110 by directly physically contacting one or more of the conductors in the sensor matrix or by otherwise hovering in close physical proximity to the one or more conductors (e.g., within 10 mm from the surface of the one or more conductors) such that a detectable change in capacitance at the detection points of the grid 110 occurs. For example, a user may engage the grid 110 by positioning a finger in close physical proximity to the grid 110, thereby causing the capacitance at the detection points of the grid 110 that are located at the center of the user's finger to deviate from a baseline value by, for example, 10 femtofarads for the detection points located at the center of the user's finger and 1 femtofarad for the detection points located at the edge of the user's finger.

The sensor 105 may include circuitry configured to generate and output a raw bitmap of measurement values associated with the user's input. In some implementations, the raw bitmap includes a measurement value (e.g., a value indicative of a measured capacitance) for each detection point in the grid 110. As noted above, a baseline measurement value (e.g., zero or a predetermined number greater than zero) may be included in the raw bitmap for each of the detection points that is not currently being engaged/touched by the user. Measurement values deviating from this baseline value by a predetermined amount may indicate detection of a user engagement at the corresponding detection point. For example, the sensor 105 may detect user engagement in the middle of the grid 110, and may output a corresponding bitmap array that includes baseline measurement values for the detection points located at the edge of the grid 110 that are not currently being engaged by the user and additionally includes values that deviate from the baseline values for the detection points located at the middle of the grid 110 that are currently being engaged by the user. In other implementations, the sensor 105 only provides data for those detection points having measurement values that deviate from the baseline values by the predetermined amount. As described in further detail below, the raw bitmap data may be used to identify the location or locations in the grid 110 where the user has touched or engaged the multi-touch display purposefully (i.e., with the intention of using the engagement or touch to control the multi-touch display application) and the location or locations in the grid 110 where the user has touched or engaged the multi-touch display incidentally (i.e., without the intention of using the engagement or touch to control the multi-touch display application).

In some implementations, the sensor 105 may include multiple detection grids 110. For example, the sensor 105 may include a first detection grid to detect capacitive objects which contact or hover near the sensor 105 and may further include a second detection grid to detect an active (or passive) stylus. In this instance, the second detection grid may be designed to sense the active (or passive) stylus and thus output the location of the active (or passive) stylus. The first detection grid may operate independently of the second grid such that its operation remains identical irrespective of whether the second grid is included or is not included in the sensor 105. The first grid may sense touches, for example, with human skin and other conductive items when using capacitive sensing and with any physical object when using FTIR sensing.

The stylus detector 115 is configured to detect the location of a stylus (or, more particularly, a stylus tip) on the grid 110. As previously discussed, this sensing of the stylus can either be accomplished through use of a second detection grid that is dedicated to identifying an active stylus or can be accomplished through use of a single detection grid that detects a passive stylus. In the implementation involving the passive stylus, the stylus detector analyzes the bitmap array output from the sensor 105 and identifies the location of the stylus by identifying a blob indicated by the bitmap array that closely matches the precise shape of the stylus tip. For example, in the case of a capacitive sensing sensor 105, the passive stylus may produce a blob having a small, round shape having dimensions roughly corresponding to the metal tip of the stylus. Notably, because the shape of the tip of the stylus is fixed and the material used to form the tip of the stylus is also fixed, the stylus produces a predictable change in capacitance when engaging the grid 110 and, therefore, is more easily detected and distinguished from other types of touches/contacts on the grid 110. The stylus detector 115 may analyze the bitmap array and may identify one or more blobs that exhibit the characteristics known to correspond to a stylus touch. In the case of an FTIR sensor 105, the passive stylus also likely has a small round tip. The stylus detector 115 may analyze the bitmap array and may determine the location of the stylus by identifying a blob having a shape that matches the shape of the small round tip. In the implementation that uses an active stylus, the second detection grid may output its own bitmap array (or portion of a bitmap array), and the stylus detector 115 may analyze the second bitmap array to identify a touch that corresponds to the location of the tip of the active stylus. In some implementations, the bitmap array generated by the second detection grid does not identify or otherwise include data corresponding to touches other than the active stylus touch.

The blob identifier 120 is configured to identify blobs, i.e., contiguous area of contact (or, more generally, engagement), based on the data in the bitmap array produced by the sensor 105. One technique that the blob identifier 120 may use to identify contiguous areas of contact (or, more generally, engagement) is blob tracking. For example, if a user places a hand, one fingertip, and a forearm on the sensor 105, then the blob identifier 120 may identify three different contiguous contact areas or blobs, one for the fingertip, one for the palm region of the hand, and one for the forearm. In implementations in which a passive stylus is used, the blob identifier 120 also may identify a contiguous contact area as corresponding to the passive stylus. The blob identifier 120 may identify the contiguous contact areas by analyzing the bitmap array to identify detection points having measurements above a certain threshold. In some implementations, the threshold is zero. In other implementations, the threshold may be a non-zero baseline value. Each contiguous area or blob may be given a distinguishing label and may be packaged as data that identifies a particular subset of the detection points of the grid 110, where each detection point corresponds to a point of contact and is adjacent to each other detection point within the subset. For example, if there are three contiguous areas identified by the blob identifier 120, then one may include 153 detection points and may be labeled "A," the second may include 53 detection points and may be labeled "B," and the third may include 640 detection points and may be labeled "C." By processing the blobs further using the resting palm and arm identifier 125 and the touch detection module 130, the system 100 may determine which blobs likely correspond to resting body part inputs and which blobs likely correspond to pointing inputs.

The touch detection module 130 is configured to receive the set of blobs identified by the blob identifier 120 and provide to the incidental contact rejection module 135 data indicating those blobs within the received set of blobs that likely correspond to pointing inputs. In some implementations, the touch detection module 130 also receives the bitmap array of measurement values from the sensor 105 in addition to the set of blobs identified by the blob identifier 130. The touch detection module 130 may analyze the blobs to identify the blobs that correspond to pointing inputs. In one implementation, the touch detection module 130 may designate a blob as corresponding to a pointing input if the blob resembles a touch produced by a fingertip. Fingertip touches typically are small and round. As such, the touch detection module 130 may identify a blob as corresponding to a pointing input if the shape of the blob (i.e., the contiguous contact region corresponding to the blob) is small and round. For example, a user may place two fingers on the sensor 105 in such a manner that the two fingers produce two distinct and overlapping contiguous contact areas or blobs.

In some implementations, the touch detection module 130 also provides to the incidental contact rejection module 135 a likelihood or confidence score that a given blob is a pointing input (e.g., a score ranging from zero to 1, where a score of 1 indicates that the blob is definitely a pointing input and a score of zero indicates that the blob is definitely not a pointing input). The touch detection module 130 also may provide additional data to the incidental contact rejection module 135 about blobs that are deemed likely to be pointing inputs (e.g., blobs having a confidence score above a certain threshold). The additional data may include, for example, a central point location and a radius for each pointing input blob. The central point location may be the estimated center point of the corresponding pointing input blob and may be determined by performing, for example, a centroid analysis of the blob, and the radius may be the radius of a circle having a center positioned at the central point location, where the circle represents the estimated two-dimensional extent of the pointing input blob as determined from the blob data received from the blob identifier 120. The center location for a given pointing input blob may be expressed using coordinates such as, for example, x and y coordinates that reflect horizontal and vertical displacements, respectively, within the grid 110 taken from an arbitrarily chosen origin.

In some implementations, the touch detection module 130 may provide different additional data about the pointing input blobs to the incidental contact rejection module 135. For example, the touch detection module 130 may model some or all of the pointing input blobs as ovals or ellipses, where the ovals or ellipses are specified by a central point location, major and minor axes lengths, and a value of an angle between the major axis and a known reference axis (e.g., a horizontal axis of the grid 110 of the sensor 105). In these implementations, the touch detection module 130 may use a radius and central point location for pointing input blobs that are best modeled as circles (as determined from the circular shape of the corresponding contiguous contact area) and may additionally use major and minor axes lengths, angle, and a central point location for pointing input blobs that are best modeled as ovals or ellipses (as determined from the oval or elliptical shape of the corresponding contiguous contact area). Since a circle is a special case of an ellipse where the major and minor axes have equal lengths, the touch detection module 130 may, in some implementations, model all of the pointing input blobs using major and minor axes lengths, angle, and a central point location, irrespective of whether a given pointing input blob is circular or oval/elliptical in shape.

The resting palm and arm identifier 125 is configured to access or receive the set of identified blobs from the blob identifier 130 and provide to the incidental contact rejection module 135 data indicating those blobs within the received set of blobs that likely correspond to resting body part inputs (e.g., resting palm and arm inputs). Specifically, the resting palm and arm identifier 125 may identify, from among the accessed or received set of blobs, those blobs that correspond to large, irregular contact areas and, as a consequence, likely correspond to resting body part inputs. In general, large, irregular contact areas typically evolve rapidly and usually occur when a user positions large, non-circular areas of skin in close physical proximity to or in direct physical contact with the grid 110 of the sensor 105. For example, a user's palm produces a large, irregular contact area when the user places a hand on a display of the system 100 to write with a stylus. Irregular contact areas may also be produced by flat palms, forearms, cheeks, stomachs, the sides of fingers, or any large conductive (or, in some implementations, nonconductive) object placed on the sensor 105

In some implementations, the system 100 may analyze the values in the bitmap array received from the sensor 105 to distinguish a relatively large and irregular contiguous contact area that results from one or more fingertips engaging the grid 110 from a relatively large and irregular contiguous contact area that instead results from a resting arm or palm engaging the grid 110. For example, the resting palm and arm identifier 125 may conclude that a large and irregularly shaped blob is not a resting body part input (e.g., an input arising from the resting of a palm, a forearm, an elbow or another relatively large body part) by comparing the values in the bitmap array corresponding to the area to a threshold value. Since the purposeful contact made with a pointing input (e.g., an input made by a fingertip) on the grid 110 is likely firmer (e.g., exhibits greater pressure or weight over more of its contact area) than that made by a resting body part input, the capacitance change generated by the pointing input may be greater than that generated by the unpurposeful resting body part input. As such, if the values corresponding to the blob are greater than a threshold value, for example, the resting palm and arm identifier 125 may conclude that the blob does not correspond to a resting body part input, despite its irregular and larger shape. Conversely, if the values corresponding to the blob are less than a threshold value, then the resting palm and arm identifier 125 may conclude that the blob corresponds to a resting body part input.

In some implementations, the resting palm and arm identifier 125 provides to the incidental contact rejection module 135 a likelihood or a confidence score that a given blob is a resting body part input (e.g., a score ranging from zero to 1, where a score of 1 indicates that the blob is definitely a resting body part input and a score of zero indicates that the blob is definitely not a resting body part input). The touch detection module 130 also may provide to the incidental contact rejection module 135 additional data about blobs that are deemed likely to be resting body part inputs (e.g., blobs having a confidence score above a certain threshold). The additional data may include, for example, one or more of the size of the of the blob (i.e., the total surface area of the blob), a bounding box that contains the contiguous area of the blob, and an ellipse that approximates the shape of the blob (e.g., specified by a major and a minor axis and central point location). The additional data also may include one or more of an eccentricity of the blob, a total capacitance of the blob for capacitance-type sensors, and a perimeter/area ratio of the blob. The operation of the resting palm and arm identifier 125 is described in greater detail below with respect to FIGS. 3 and 4.

The incidental contact rejection module 135 receives input from the following three different modules: the stylus detector 115, the resting palm and arm identifier 125, and the touch detection module 130. The incidental contact rejection module 135 processes the data received from these three modules to identify the blobs that correspond to intended touches and the blobs that correspond to incidental touches.

The incidental contact rejection module 135 presupposes that incidental touches exist, i.e., that a user may rest body parts on the sensor 105 that are not intended by the user to act as input to the sensor 105 (i.e, not intended by the user to exercise control of an application of the system 100 or to otherwise invoke interactions between the user and the system 100). For example, the sensor 105 may be integrated into a desktop on which a user may rest his or her elbows and palm while writing with a stylus through use of a stylus writing application. In this example, the user does not intend that his or her palm or elbows act as inputs to the sensor 105. Rather, the palm and elbow touches are incidental to the intended touch resulting from the tip of the stylus engaging the sensor 105.

The incidental contact rejection module may provide output that identifies or otherwise indicates those blobs that it determines should be ignored because they are not touches intended by the user to be received by the sensor 105 as input. Notably, in implementations involving use of a stylus, the blob created by the stylus contacting (or engaging) the sensor 105 may bypass the incidental contact rejection module 135 or otherwise pass straight through the incidental contact rejection module 135 with minimal or no processing because such stylus engagement is highly likely to correspond to an intended touch by the user. In some implementations, the output of the incidental contact rejection module 135 may include a confidence score for each or for some of the blobs received from the above-noted three modules, where the confidence score indicates the likelihood that the corresponding blob is the result of an intended touch by the user (e.g., a touch point intended by the user to be received by the sensor 105 as input). In some implementations, the confidence score may be a mathematical combination of the scores generated by all or some of the sub-modules of the incidental contact rejection module 135, which are described in more detail below. In other implementations, the module 135 may instead separately provide one or more different confidence scores for each of the blobs, where each of the one or more different confidence scores is generated by a different sub-module of the incidental contact rejection module 135.

The touch point filter 140 receives the output from the incidental contact rejection module 135 and processes the output to identify which blobs will be communicated to an application of the system 100 for further processing. As noted above, the output of the incidental contact rejection module 135 may include, for example, an identifier for each of one, some or all of the blobs. The output of the incidental contact rejection module 135 may further include, for each identified blob, a corresponding one or more confidence scores (e.g., scores from 1 to 100) that indicate the likelihood that the corresponding blob is the result of an intended touch (e.g., scores closer to 100 indicate that the blob is more likely the result of an intended touch, while scores closer to zero indicate that the blob is more likely the result of an incidental touch).

The touch point filter 140 is configured to determine which blobs will be communicated to or otherwise made accessible to the application by analyzing the confidence score or scores received from the incidental contact rejection module 135. In implementations in which a single, aggregate confidence score is received from the incidental contact rejection module 135 for each blob, the touch point filter 140 may compare the score to a threshold value and may communicate the corresponding blob to the application only if the results of the comparison indicate that the blob corresponds to an intended touch. Continuing the above example in which confidence scores range from 1 to 100, the threshold value may be 75 and only those blobs having a confidence score of 75 or greater may be deemed to correspond to intended touches and, therefore, may be passed along by the touch point filter 140 to the application for further processing. Those blobs having confidence scores below 75 may be deemed to likely be the result of incidental touches and, therefore, may be filtered out by the touch point filter 140 and not communicated to the application.

In some implementations, the touch point filter 140, additionally or alternatively, may receive a separate score for a blob from one, some or all of the submodules of the contact rejection module 135. In these implementations, the touch point filter 140 may average the scores and compare them to a threshold to determine if the corresponding blob should be communicated to the application. In some implementations, this average is a weighted average. In some implementations, the touch point filter 140 may communicate a blob to the application if one of the sub-modules indicates that the blob is likely a pointing input blob.

In some implementations, the touch point filter 140 may analyze the output from each sub-module of the incidental contact rejection module 135 to decide which blobs to communicate to the application. In some implementations, the touch point filter 140 may communicate both intended touches (e.g., fingertip pointing touches) as well as incidental touches (e.g., resting arm and palm contact regions) to the application for further processing.

Figure 2:
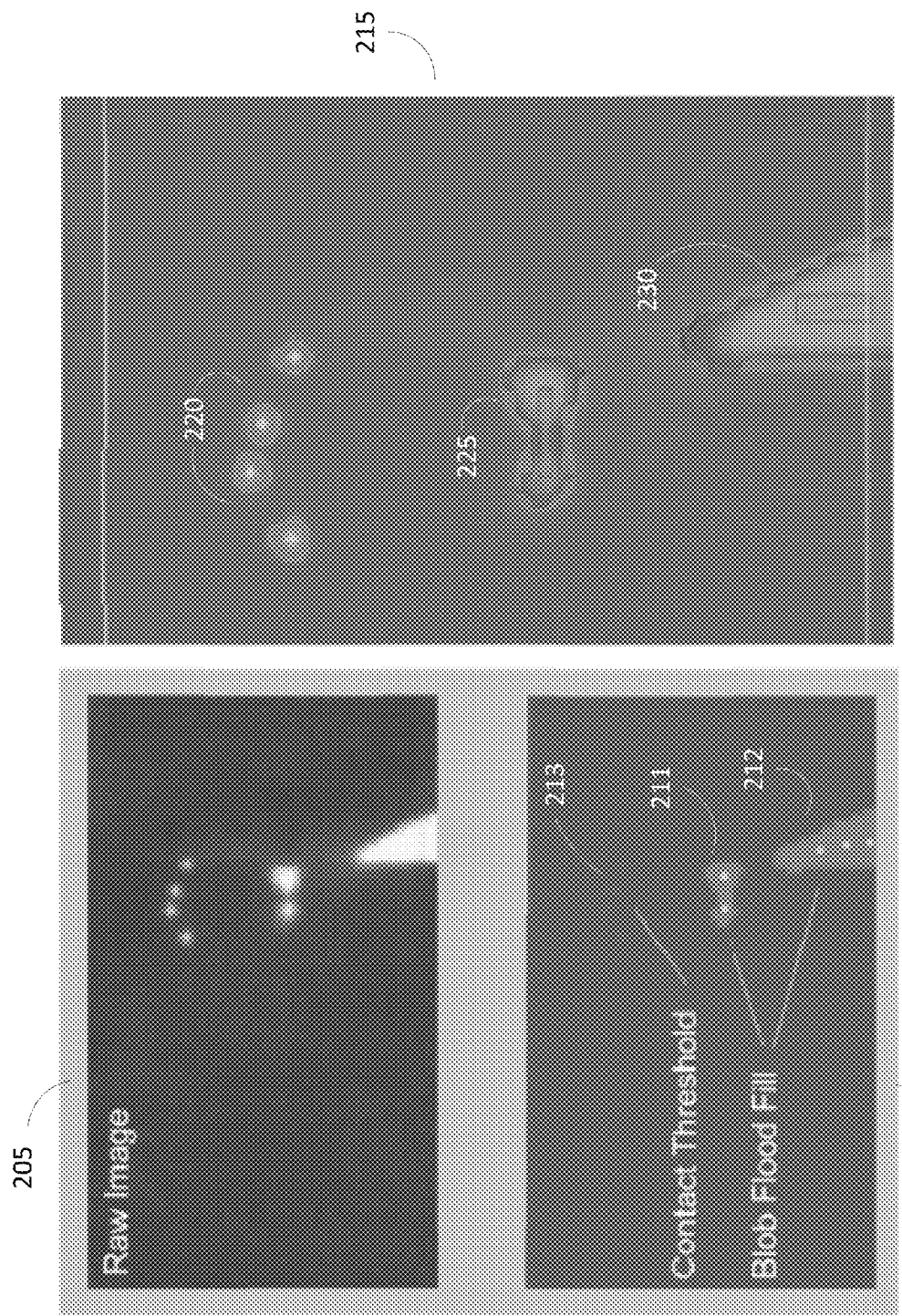
FIG. 2 shows an example input received by a multi-touch display device.

FIG. 2 shows example input sensed by the sensor 105. Image 205 shows a raw image of sensor data captured by the sensor 105 based on a user placing a forearm and a hand on the sensor 105 with curled fingers. The system 100 records the location of each contact with the sensor 105 as a series of pixels. The system 100 also records capacitance measured by each pixel and stores the result as an array of pixels each containing a capacitance measurement. When the array is visualized, the result is the image 205.

Image 210 shows processing that the system 100 has performed to identify the regions of contact. The system 100 identifies the perimeter of each contact region and fills in the entire area of each contact region as noted by the "blob flood fill." The system 100 defines a minimum capacitance that will define the edge of a blob and fills inside the blob to assist in identifying each particular blob. For example, the system 100 identifies those pixels that satisfy a capacitance threshold around a palm region 211 and an arm region 212 and fills in the area defined by the capacitance threshold. The system 100 also identifies the contact regions that satisfy a contact threshold. The contact threshold is set by the system 100 to identify regions of contact with the sensor 105. For example, if the contact threshold is one femtofarad. A user contact of a half femtofarad will not be considered a contact and will not be processed further by system 100. A user contact of two femtofarads will be considered a contact and will be processed further by the system 100. The contacts 213 met the threshold and the area surrounding each contact has been filled in.

Image 215 shows processing that the system 100 has performed to identify areas of point touches and resting body parts. The system 100 has identified four regions 220 that likely correspond to point touches and has indicated the center of each point touch with a cross. The system 100 has identified two regions that likely correspond to resting body parts. The dumbbell shaped region 225 includes two areas of higher capacitance at the edges of the center rectangle. The triangular shaped region 230 includes an area of higher capacitance at the center rectangle.

Figure 3:
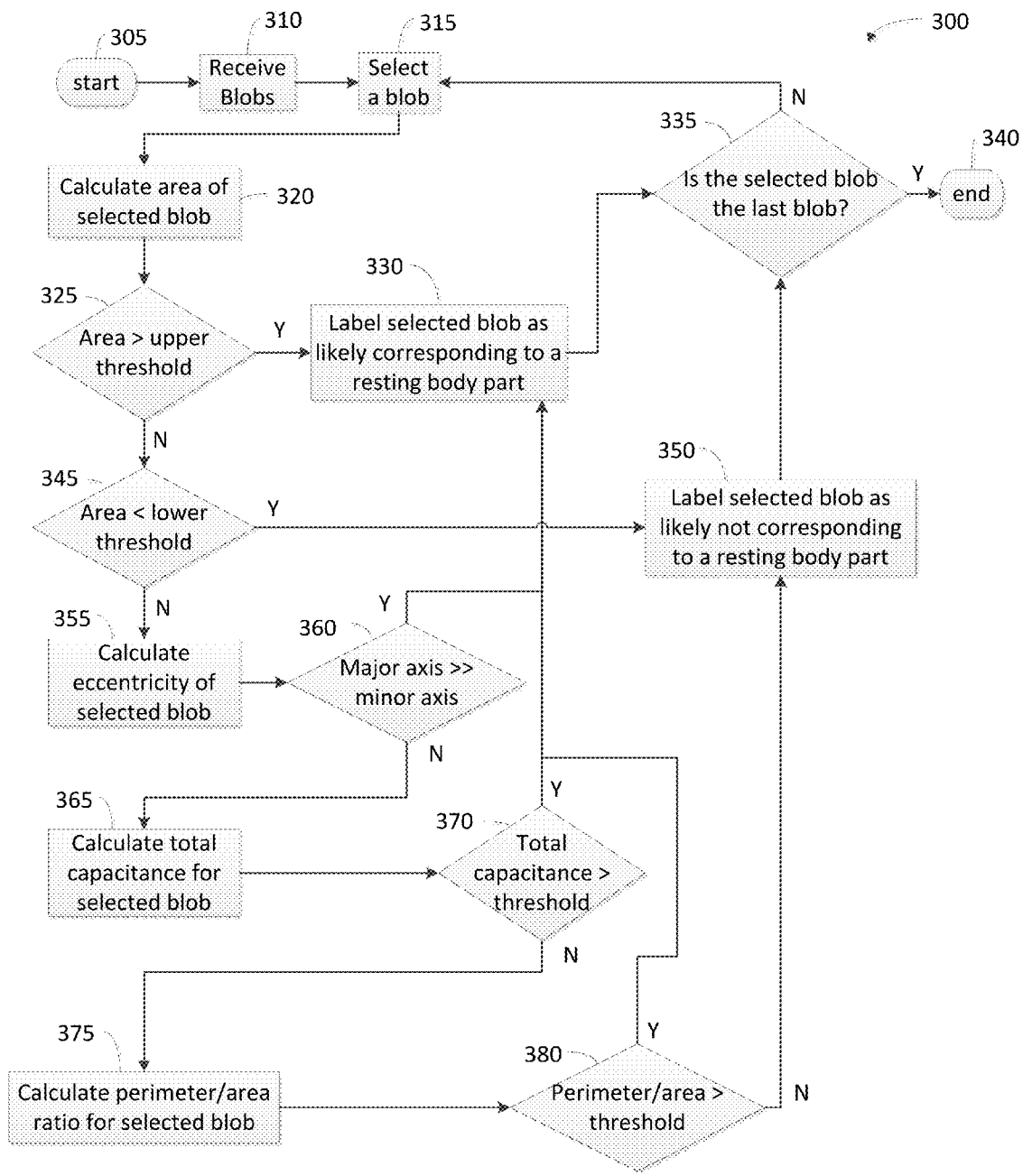
FIG. 3 is a flowchart of an example of the operation of a resting palm and arm identifier module.

FIG. 3 illustrates an example process 300 performed by the resting palm and arm identifier 125. In the process 300, the resting palm and arm identifier 125 analyzes blobs received from the blob identifier 120 and labels them as either likely or not likely corresponding to a resting body part. The resting palm and arm identifier 125 calculates the area, eccentricity, total capacitance, and perimeter to area ratio for each blob and uses those calculations to label each blob as either likely or not likely corresponding to a resting body part.

The palm and arm identifier 125 receives a list of blobs from the blob identifier 120 (310). The list of blobs identifies each blob detected by the blob identifier 120 and shape data descriptive of a shape of each blob. After receiving the list of blobs, the palm and arm identifier 125 selects a blob from the list of blobs (315). For instance, the palm and arm identifier 125 selects the first blob included in the list of blobs or selects the blob in the list of blobs that covers the largest area and, thus, is most likely to be a resting body part. The palm and arm identifier 125 then calculates the area of the selected blob (320). For example, the palm and arm identifier 125 determines a location of the perimeter of the selected blob and computes the area inside the perimeter. In some implementations, the palm and arm identifier 125 identifies the perimeter of the selected blob by detecting where the capacitance readings from the detection points transition from indicating contact to indicating a lack of contact (e.g., reach zero). The palm and arm identifier 125 also may determine the perimeter of the selected blob by detecting where the capacitance readings drop below a particular threshold other than zero.

The palm and arm identifier 125 then compares the area of the selected blob to particular thresholds (325) and (345). If the area is above an upper threshold, then the blob is labeled as likely corresponding to a resting body part (330). If the area is below a lower threshold, then the selected blob is labeled as not likely corresponding to a resting body (350). For example, the palm and arm identifier 125 may set the upper threshold as twenty square centimeters and a lower threshold at three square centimeters. If the selected blob has an area of one square centimeter, then it is labeled as likely not corresponding to a resting body part. If the selected blob has an area of twenty-five square centimeters, then it is labeled as likely corresponding to a resting body part. If the selected blob has an area of ten square centimeters, then the selected blob proceeds to the next calculation. In some implementations, a confidence score is assigned to the blob where the confidence score reflects how likely it is that the selected blob corresponds to a resting body part. In some implementations, if the area is a percentage above the upper threshold, then that percentage is translated into a confidence score. If the area is a percentage below the lower threshold, then that percentage is translated into a confidence score. For example, if the upper threshold is eight square centimeters, then any blob with an area above that would be labeled as likely corresponding to a resting body part. A different confidence score could be assigned to a blob which was ten square centimeters compared to one that was one hundred square centimeters. In addition, if the lower threshold is four square centimeters, then any blob with an area below that would be labeled as likely not corresponding to a resting body part. A different confidence score could be assigned to a blob that was three square centimeters compared to one that was two tenths of a square centimeter.

Based on a determination that the selected blob has an area that falls between the upper threshold and the lower threshold, the resting palm and arm identifier 125 then calculates the eccentricity of the selected blob (355). To calculate eccentricity, the resting palm and arm identifier 125 fits an ellipse around the selected blob. The ellipse has a major, longer axis and a minor, shorter axis and the resting palm and arm identifier 125 determines the length of the major axis and the minor axis. The resting palm and arm identifier 125 then determines whether the length of the major axis is significantly greater than the length of the minor axis (360). Based on a determination that the length of the major axis is significantly greater than the length of the minor axis, the resting palm and arm identifier 125 labels the selected blob as likely corresponding to a resting body part (330). Otherwise, the calculations continue. For example, if the resting palm and arm identifier 125 fits an ellipse around the selected blob and the major axis is ten centimeters and the minor axis is two centimeters, then the eccentricity is five. The eccentricity threshold to determine if the major axis is significantly greater than the minor axis may be set at four. Therefore, the selected blob would be labeled as likely corresponding to a resting body part. If the eccentricity were two, then the resting palm and arm identifier 125 would continue to the next step. The purpose of calculating eccentricity of the selected blob is based upon the idea that pointing fingers are typically round. If an ellipse is fit around a pointing finger, then the major and minor axis would be very close. If an ellipse is fit around an arm resting on the sensor 105, then the ellipse will have a relatively long major axis along the length of the arm and a relatively short minor axis along the width of the arm. In some implementations, the comparison of the major and minor axes can result in a confidence score. For example, if the major axis is greater than twice the length of the minor axis, then the selected blob is labeled as likely corresponding to a resting body part. If the major axis is two times the length of the minor axis, then the confidence score can be set relatively low. If the major axis is ten times the length of the minor axis, then the confidence score can be set higher. The palm and arm identifier 125 may account for the area of the selected blob in addition to the eccentricity in setting a confidence score.

Based on a determination that the length of the major axis is not significantly greater than the length of the minor axis for the ellipse fitted around the selected blob, the resting palm and arm identifier 125 calculates the total capacitance of the selected blob (365) and determines whether the total capacitance meets a threshold (370). If the total capacitance is greater than the threshold, the resting palm and arm identifier 125 labels the selected blob as likely corresponding to a resting body part (330). Otherwise, the resting palm and arm identifier 125 continues to the next calculation. The total capacitance may indicate the force with which the user presses on the sensor 105. Although capacitive sensing detection grids are not directly sensitive to pressure, if a user is pressing firmly with a finger, the capacitance generated by that finger press is higher than if the user presses lightly with the finger. The total capacitance is calculated by adding up each of the capacitance values from each detection point inside the selected blob. For example, if the selected blob contains one hundred detection points and fifty of those detection points have a measured capacitance of five femtofarads, thirty measure three femtofarads, and twenty measure two femtofarads, then the total capacitance for the selected blob is three hundred and eighty femtofarads. If the threshold is set to three hundred femtofarads, then the selected blob is labeled as likely corresponding to a resting body part. In some implementations, a confidence score can be computed with the determination that the selected blob likely corresponds to a resting body part. For example, if the threshold is three hundred femtofarads and the selected blob's total capacitance is three hundred and ten femtofarads, then the confidence score would be lower than if the selected blob's total capacitance were three thousand femtofarads. For both the selected blobs with a total capacitance of three hundred and ten femtofarads and three thousand femtofarads, both would be labeled as likely corresponding to a resting body part since each is above the example threshold of three hundred femtofarads. In some implementations, the capacitance of each detection point in the selected blob is averaged over the total number of detection points. For example, if the selected blob contains one hundred detection points and the total capacitance is five hundred femtofarads, then the average capacitance per detection point would be five femtofarads. This average is then compared to a threshold value to determine if the selected blob likely corresponds to a resting body part. When averaging the capacitance for detection points, confidence scores can be used in a similar fashion as with total capacitance measurements.

Based on a determination that the total capacitance for the selected blob does not meet the threshold, the resting palm and arm identifier 125 then calculates the perimeter to area ratio for the selected blob (375) and determines whether the perimeter to area ratio for the selected blob meets a threshold (380). If the perimeter to area ratio of the selected blob is greater than the threshold, the resting palm and arm identifier 125 labels the selected blob as likely corresponding to a resting body part (330). Otherwise, the resting palm and arm identifier 125 labels the selected blob as likely not corresponding to a resting body part (350). For example, if the selected blob had a perimeter to area threshold were set at five to one, then a perimeter to area ratio of four to one would cause the selected blob to be labeled as likely not corresponding to a resting body part. If the perimeter to area ratio was eight to one, then the selected blob would be labeled as likely corresponding to a resting body part. This calculation is based on the idea that pointing fingers that the user intends to be control inputs to the sensor 105 have a relatively small perimeter to area ratios because they are typically round. Resting body parts typically have higher perimeter to area ratios because of their irregular shape. For example, a circle with an area of one square centimeter has a perimeter of about 3.54 centimeters giving the circle a perimeter to area ratio of 3.54 to one. For a square of area one square centimeter, the perimeter is four centimeters, giving the square a perimeter to area ration of four to one. For a non-circular shape of equal area to a circular shape, the non-circular shape will have a higher perimeter to area ratio. In some implementations, the difference between the threshold and the perimeter to area ratio of the selected blob is used to calculate a confidence score that the selected blob is likely a resting body part. For example, if the threshold is five to one and the perimeter to area ratio of the selected blob is six to one, then that will translate into a lower confidence score than if the perimeter to area ratio of the selected blob is twenty-five to one. In setting a confidence score, the resting palm and arm identifier 125 may consider the perimeter to area ratio of the selected blob in addition to the total capacitance of the selected blob, the eccentricity of the selected blob, and the area of the selected blob.

Once the area, eccentricity, capacitance, and perimeter to area ratio of the selected blob are calculated, and none of them are found to be in the range required to label the blob as likely corresponding to a resting body part, then the resting palm and arm identifier 125 labels the selected blob as likely not corresponding to a resting body part (350). When the resting palm and arm identifier 125 reaches this point, it is likely that the selected blob is small, round and likely the result of a pointing finger. Once a blob is labeled as either likely corresponding to a resting body part or not, then the resting palm and arm identifier 125 determines if there are additional blobs to be processed (335). If there are additional blobs, then a new blob is selected (315). If there are no additional blobs remaining, then the resting palm and arm identifier 125 has completed its processing (340). For example, if there are two blobs remaining to be processed, then the resting palm and arm identifier will repeat the procedure above. If there are no blobs remaining, then the resting palm and arm identifier has finished its processing and outputs results of which blobs correspond to resting body parts and which blobs do not.

Figure 4:
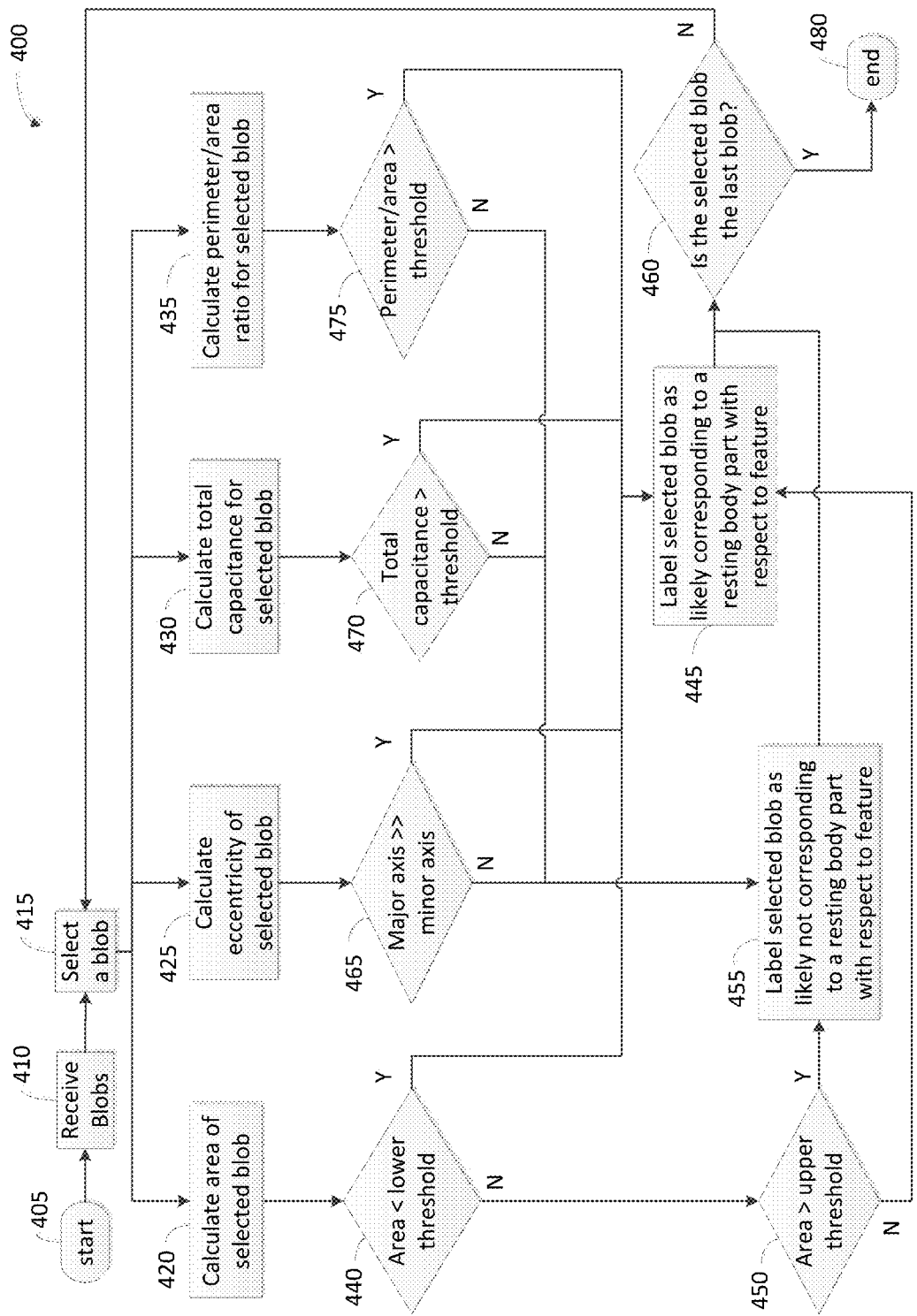
FIG. 4 is a flowchart of an example of the operation of a resting palm and arm identifier module.

FIG. 4 illustrates an example process 400 performed by the resting palm and arm identifier 125. FIG. 4 is similar to FIG. 3 and includes all of the same calculations and determinations as FIG. 3, such as calculating the area, eccentricity, total capacitance, and perimeter to area ratio for each blob. The difference between FIG. 4 and FIG. 3 is the order in which those calculations are made. In FIG. 3, the calculations are made serially. With the exception of determining if the area is below a certain threshold, each aspect of the blob is calculated before labeling the blob as likely not corresponding to a selected body part. In FIG. 4, the process 400 starts (405) with the resting palm and arm identifier 125 receiving a list of blobs (410) and selecting a blob (415). After the blob is selected, the resting palm and arm identifier 125 performs all calculations in parallel, rather than serially as shown in FIG. 3. The calculations performed in parallel include calculating the area of the selected blob (420), calculating the eccentricity of the selected blob (425), calculating the total capacitance of the selected blob (430), and calculating the perimeter to area ratio of the selected blob (435). For example, a selected blob has an area of ten centimeters, an eccentricity of eight tenths, a total capacitance of nine femtofarads, and a perimeter to area ratio of four to one, then depending on the thresholds used in the determinations made with respect to reference numerals 440, 450, 465, 470, and 475, the selected blob may be labeled as likely corresponding to a resting body part with respect to one feature and labeled as likely not corresponding to a resting body part with respect to another feature. For that reason, when appropriate, the resting palm and arm identifier 125 assigns the label of likely not corresponding to a resting body part with an indication of the feature that resulted in the selected blob being labeled as likely not corresponding to a resting body part (455). The resting palm and arm identifier 125 also, when appropriate, labels the selected blob as likely corresponding to a resting body part with an indication of the feature that resulted in the selected blob being labeled as likely corresponding to a resting body part (445). In some implementations, a confidence score is assigned to each label and those confidence scores are provided with the labels. The confidence scores and labels may be used by other modules or parts of the system when determining how to treat that particular blob.

Once a blob has been labeled, the resting palm and arm identifier 125 determines if there are additional blobs to be processed (460). If there are additional blobs, then a new blob is selected (415). If there are no additional blobs remaining, then the resting palm and arm identifier 125 has completed its processing (480).

Figure 5:
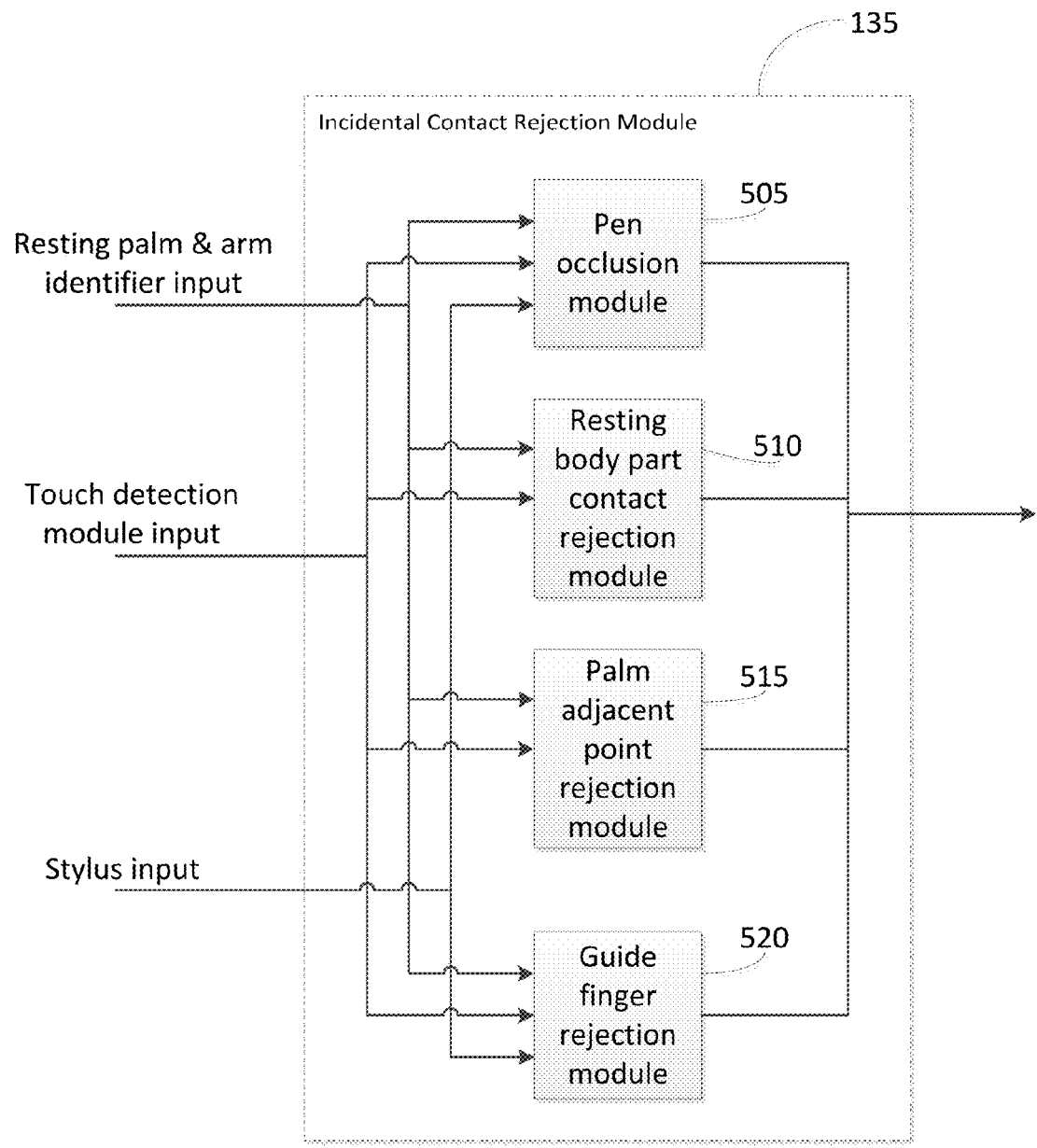
FIG. 5 is an example system diagram of an incidental contact rejection module.

FIG. 5 is an example system diagram for the incidental contact rejection module 135. In this example, the incidental contact rejection module 135 includes the pen occlusion module 505, the resting body part contact rejection module 510, the palm adjacent point rejection module 515, and the guide finger rejection module 520. The pen occlusion module 505 labels contact points in an occluded area defined by the palm and stylus point as contact points likely corresponding to incidental contact. The resting body part contact rejection module 510 labels contact points which are contained in resting body part contact areas (e.g., palm contact areas) as contact points likely corresponding to incidental contact. The palm adjacent point rejection module 515 labels contact points near a palm contact area (or other resting body part contact area) as contact points which likely correspond to incidental contact. The guide finger rejection module 520 labels contact points which likely correspond to a guide finger as contact points which likely correspond to incidental contact.

The pen occlusion module 505 is a sub module of the incidental contact rejection module 135. The pen occlusion module 505 receives input from the resting palm and arm identifier 125, the stylus detector 115, and the touch detection module 130. The pen occlusion module 505 outlines a region between a stylus and a corresponding palm and labels touch points inside those regions as points that should be labeled as likely incidental. The pen occlusion module 505 is capable of outlining multiple regions for multiple stylus-palm pairs and labeling touch points inside those regions as points that should be labeled as likely incidental. In some implementations, the likelihood is indicated by a score. To outline the region, the pen occlusion module 505 calculates a center point, or centroid, of the palm region. This center point forms the center of the occluded region. In some implementations, the occluded region is in the shape of a kite. The diagonal lines of the kite intersect at the center point of the palm region and one of the vertices is the stylus tip. The diagonal line perpendicular to the line intersecting the stylus is long enough such that the region bounded by the kite includes areas of the palm which are nearest to the palm. In other implementations, the shape of the occluded region is a triangle with a height extending from the center point of the palm region to the stylus tip and a base extending far enough to encompass the palm region.

The resting body part contact rejection module 510 is another sub module of the incidental contact rejection module 135. The resting body part contact rejection module 510 receives input from the resting palm and arm identifier 125 and the touch detection module 130. The resting body part contact rejection module 510 analyzes the contiguous contact regions and determines which areas labeled as likely point touches are inside those areas labeled as likely resting arms or palms. In some implementations, the likelihood is indicated by a score. Point touches which are inside resting palms or arms are labeled as incorrect touch detections. For example, if a user places a hand down in a writing fashion on the sensor 105, the edge of the hand will make a large non-circular contiguous region in the sensor. Point touches may be identified by the touch detection module 130 for the areas which make firm contact with the sensor 105 and thus register the highest capacitance. A resting arm and palm may be identified for the entire area where the side of the hand contacts or hovers over the sensor 105. The resting body part contact rejection module 510 will mark those point touches located inside the palm region and label them as likely incidental user contact and/or incorrect touch detections.

The palm adjacent point rejection module 515 is yet another sub module of the incidental contact rejection module 135. The palm adjacent point rejection module 515 receives input from the resting palm and arm identifier 125 and the touch detection module 130 and outputs those point touches that are inside a threshold outline of resting arms and palms and labels those point touches as likely corresponding to incidental user contact. In some implementations, the likelihood is indicated by a score. In some examples, there is a maximum threshold for the size of the resting arm and palm region for the palm adjacent point rejection module 515 to analyze nearby point touches. For instance, the goal of this module may be to locate point touches near a palm region. If the area of the resting body part is above a certain threshold, then the region is likely not a palm and therefore nearby point touches may not be incidental. In an example where the resting body part is about the size of a typical palm, then the palm adjacent point rejection module 515 determines an outline around the resting body part region a certain distance from the perimeter. If a point touch falls within that outline around the perimeter, then the point touch is labeled as likely corresponding to incidental contact.

The guide finger rejection module 520 is a further sub module of the incidental contact rejection module 135. The guide finger rejection module 520 receives input from the resting palm and arm identifier 125, the stylus detector 115, and the touch detection module 130. The goal of the guide finger rejection module 520 is to recognize and label as incidental contact a guide finger that the user purposefully places and drags along the sensor 105 to draw a line. For example, if a user wants to draw a straight line with the stylus across the sensor 105, then the user may place his pinky finger, or any other finger, down on the sensor 105 and drag it along the sensor 105 while the user is moving the stylus across the sensor 105. This is not necessarily incidental contact because the user intended to place his finger on the sensor 105 in a precise manner, but it is contact that the user does not want to interact with the sensor 105. The guide finger rejection module 520 analyzes the inputted data and labels those point contacts which have a strong correlation to the stylus input as likely corresponding to a guide finger. In some implementations, the likelihood is indicated with a score.

Figure 6:
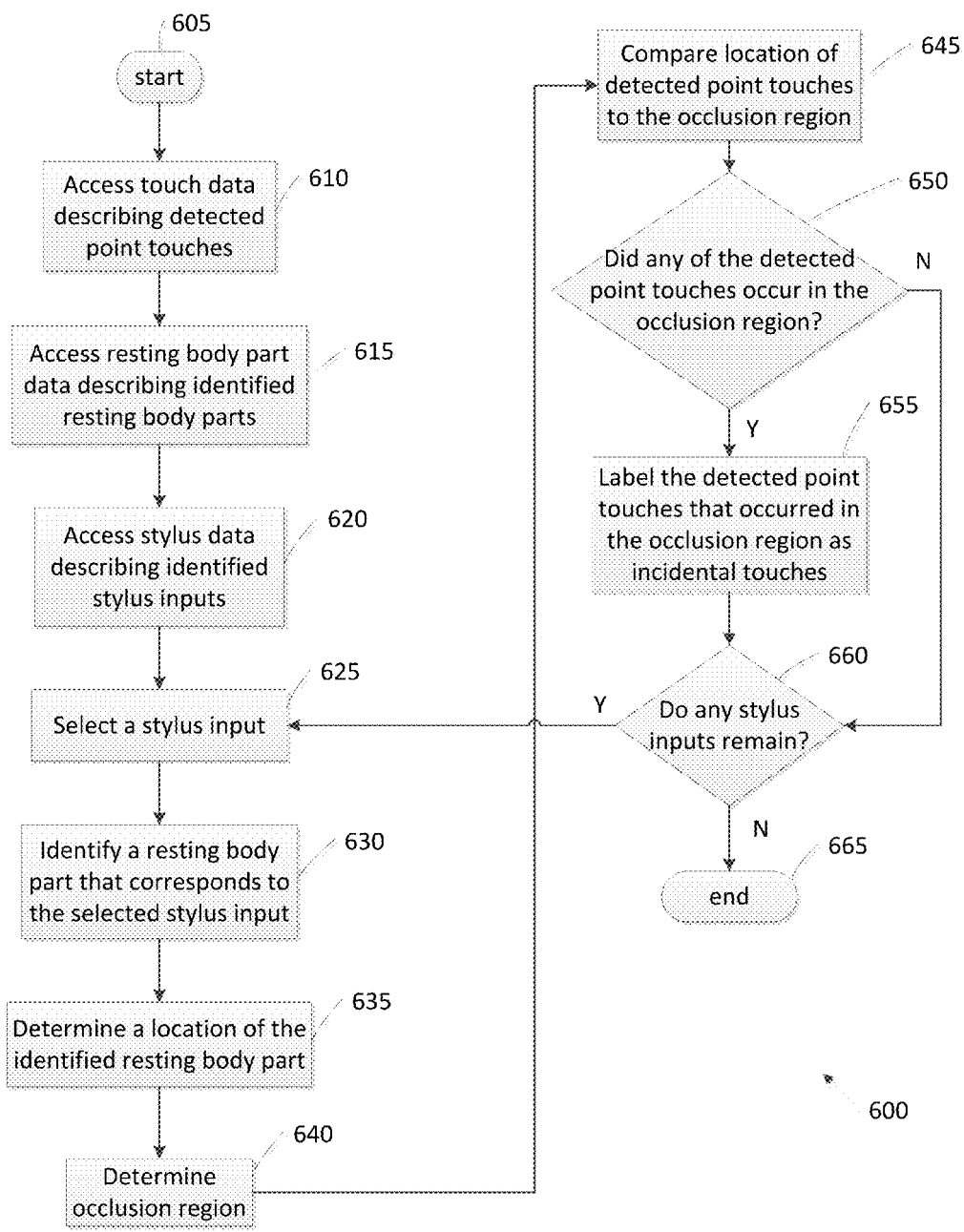
FIG. 6 is a flowchart of an example of the operation of a pen occlusion module.

FIG. 6 illustrates an example process 600 performed by the stylus or pen occlusion module 505. The pen occlusion module 505 determines if any of the point touches are likely the result of dropped fingers that resulted from fingers that engaged the sensor 105 when the user was resting the user's palm on the sensor 105. Typically, this situation occurs when a user is writing with a stylus on the sensor 105. When the user rests the user's palm on the sensor 105 and begins to engage the sensor 105 with the stylus, the user's palm and arm may not be the only incidental touches. If a user is engaging the sensor with a stylus and is resting the user's palm and arm on the sensor, the user may engage the sensor with the point of a finger that is not holding the stylus. Typically, these fingers are not intended by the user to change what is displayed on the sensor, and therefore should be ignored by the system.

The pen occlusion module 505 accesses data describing the detected point touches (610). These point touches have been identified by the point touch detection module 130 as likely corresponding to touches that the user intended to interact with what is displayed. For example, if the user engaged the sensor 105 with a fingertip, then the pen occlusion module 505 could access the data that described the fingertip contact.

The pen occlusion module then 505 accesses data describing the identified resting body parts (615). These resting body parts have been identified by the resting palm and arm identifier 125 as likely corresponding to resting body parts that the user did not intend to interact with the sensor. For example, if the user engaged the sensor 105 with a resting palm, then the pen occlusion module 505 could access the data that described the resting palm contact.

The pen occlusion module 505 then accesses data describing the detected stylus inputs (620). These stylus inputs have been identified by the stylus detector and are the inputs that have been identified as those that correspond to the styluses that have engaged the sensor. For example, if the user engaged the sensor 105 with a stylus, then the pen occlusion module 505 could access the data that described the stylus contact.

Once the pen occlusion module 505 has accessed all the touch data, the module begins processing the touch data to identify any point touches that are located in an occluded region. The module 505 selects one of the stylus inputs (625). For example, the module can select a stylus point that is closest to one of the resting palms. Typically, the user will only be interacting with the sensor using one stylus. In other instances, the user may have a stylus in both hands and engaging the sensor with both styluses. Additionally, a second user may be engaging the sensor with a stylus.

The pen occlusion module 505 identifies a resting body part that corresponds to the selected stylus input (630). To determine if a resting body part corresponds to the selected stylus input, the system can identify the resting body part that is closest to the stylus input. For example, the module can examine the areas engaged by the sensor around a radius of the center of the stylus input. The first area that corresponds to a resting body part can be selected for processing. In some implementations, the system can select more than one resting body part and perform the same steps on the additional resting body parts. In other implementations, the system may determine the area of the resting body part, the eccentricity of the resting body part, the total capacitance of the resting body part, or the perimeter to area ratio of the resting body part to determine if the resting body part likely corresponds to a resting palm. In identifying the resting body part that corresponds to the selected stylus input, the pen occlusion module 505 selects a resting body part that is located at a position where a palm of a hand holding a stylus would likely rest relative to the stylus input.

The pen occlusion module 505 determines a location of the identified resting body part (635). In some implementations, the location is the center point of the identified resting body part. In other implementations, the location is the moment of inertia of the identified resting body part. For example, the location can be at the centroid or center of mass of the identified resting body part. In some examples, the location is the location of the highest capacitance measurement detected by the sensor for the resting body part. Where the capacitance is highest at more than one location on the identified resting body part, the pen occlusion module 505 may determine a location of the resting body part by determining the center point of the region where the capacitance is highest or determining the moment of inertia of the region.

The pen occlusion module 505 determines an occlusion region associated with the identified resting body part (640). In some implementations, the occluded region is an isosceles triangular region where one vertex of the triangle is located at the stylus and the base of the triangle passes through the location of the resting body part identified in stage 635. For example, the occluded region can include an isosceles triangle with a vertex at the stylus input and a base that intersects the location inside the resting body part. The length of the base can be long enough to extend past the edges of the resting body part. In some implementations, the occluded region is a kite where a vertex is located at the stylus and an opposite vertex is located at the location in the resting body part identified in stage 635. In some examples, the occluded region is adjusted at the stylus location such that the stylus will be outside the occlusion region. In some implementations, the width of the occlusion region is wide enough to cover the edges of the resting body part region. In some implementations, the width of the occluded region includes the resting body part and a particular threshold beyond the resting body part. The width of the occlusion region is the distance perpendicular to the distance from the stylus tip to the center of the resting body part region.

In some implementations, the pen occlusion module 505 may identify more than one resting body part for a particular stylus input. In this instance, the pen occlusion module 505 determines an occlusion region for each resting body part.

The pen occlusion module 505 then compares the location of the detected point touches to the occlusion region (645) and, based on the comparison, determines whether any of the point touches were detected in the occlusion region (650). Based on a determination that one or more of the point touches were detected in the occlusion region, the pen occlusion module 505 determines the point touches that occur inside the occlusion region and labels those point touches as incidental point touches (655). For example, if there is are two point touches that are located inside the occlusion region, then those points are labeled as incidental touches. In some implementations, the point touches need to be completely inside the occlusion region to be labeled incidental point touches. In other implementations, if any portion of the point touches is inside the occlusion region, then those point touches are labeled as incidental point touches. Point touches that are not labeled as incidental by the pen occlusion module 505 continue to be labeled as intended point touches. Any additional occlusion regions are processed by the pen occlusion module 505 similar to the processing described above.

The pen occlusion module 505 then determines if there are any stylus inputs that remain and have not been processed by the pen occlusion module (660). If one or more stylus inputs remain, the pen occlusion module 505 selects another stylus input (625) and repeats the processing of labeling touch points within an occlusion region for the selected stylus input as incidental touches. Otherwise, the process is finished (665).

Figure 7:
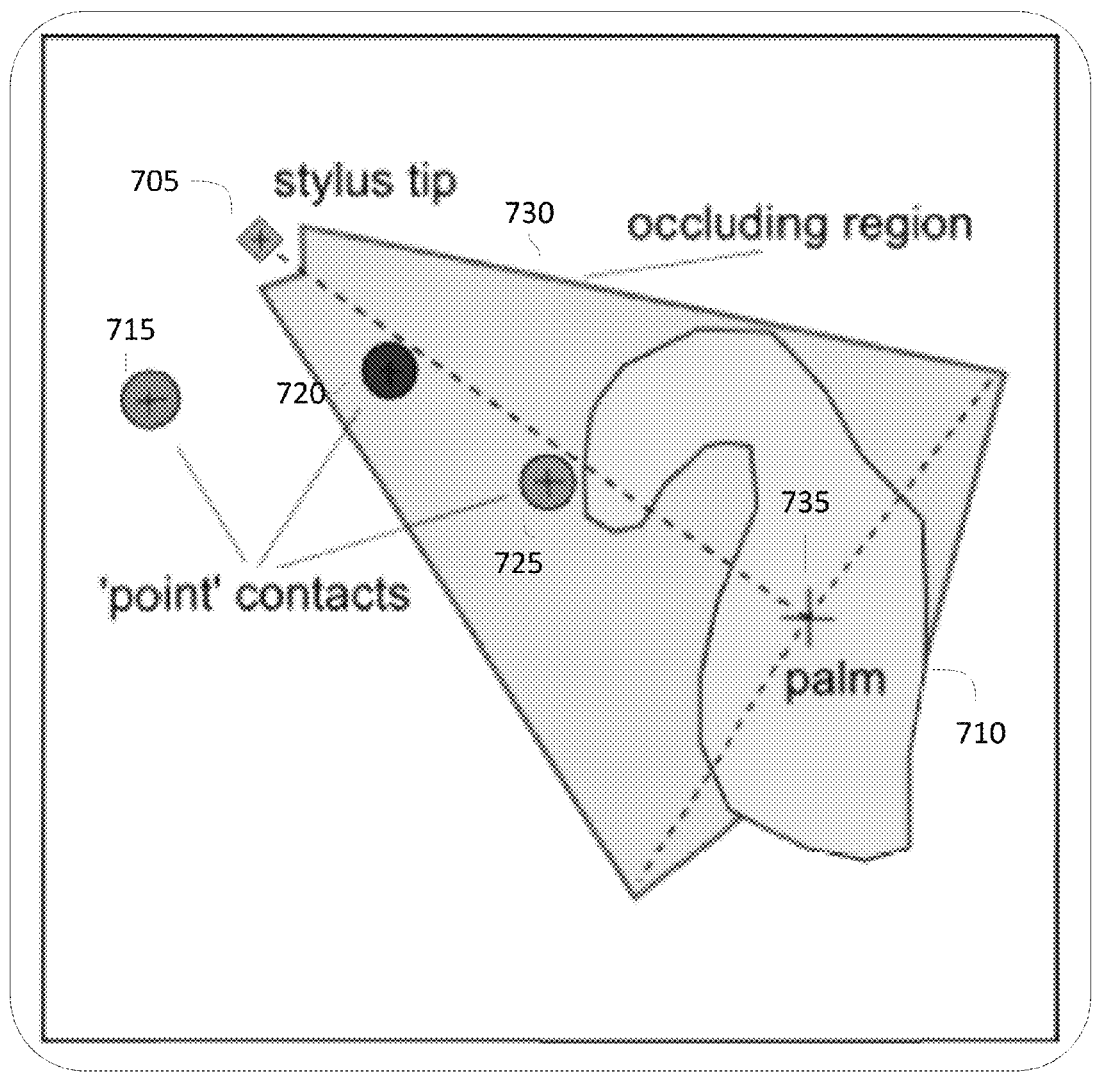
FIG. 7 shows an example occluded region with corresponding contacts labeled as incidental.

FIG. 7 shows an example occlusion region and the corresponding stylus input, point touches, and resting body part input. The regions shown in FIG. 7, with the exception of the occlusion region, are where the user has engaged the sensor. Stylus tip 705 indicates the location at which the stylus tip engaged the sensor. The center point of the stylus tip 705 is indicated by the cross inside the stylus tip 705. The resting body part region identified as corresponding to the stylus tip 705 is the resting body part 710. Resting body part 710 roughly indicates the outline of where a typical resting palm would engage the sensor when a user is writing with a stylus that engages the sensor at the stylus tip 705. Point touches 715, 720, and 725 indicate the location of where the system identified point touches. Each point touch is the location of where a rounded pointing object engaged the sensor. Typically, the touch points are the location where the user has engaged the sensor with the user's finger tips.

Once the system has identified the inputs, the system determines the occlusion region 730. In this example, occlusion region 730 is a kite with one vertex located at the stylus tip 705. The intersection of the perpendicular diagonal lines of the kite is located at the moment of inertia 735 of resting body part 710. Inside the occlusion region 730 are point touches 720 and 725. Outside the occlusion region 730 is point touch 715. Therefore, the pen occlusion module 505 labels the point touches 720 and 725 as incidental based on a determination that the point touches 720 and 725 occurred in the occlusion region 730. The pen occlusion module 505 maintains the point touch 715 as an intended touch based on a determination that the point touch 715 occurred outside of the occlusion region 730.

Figure 8:
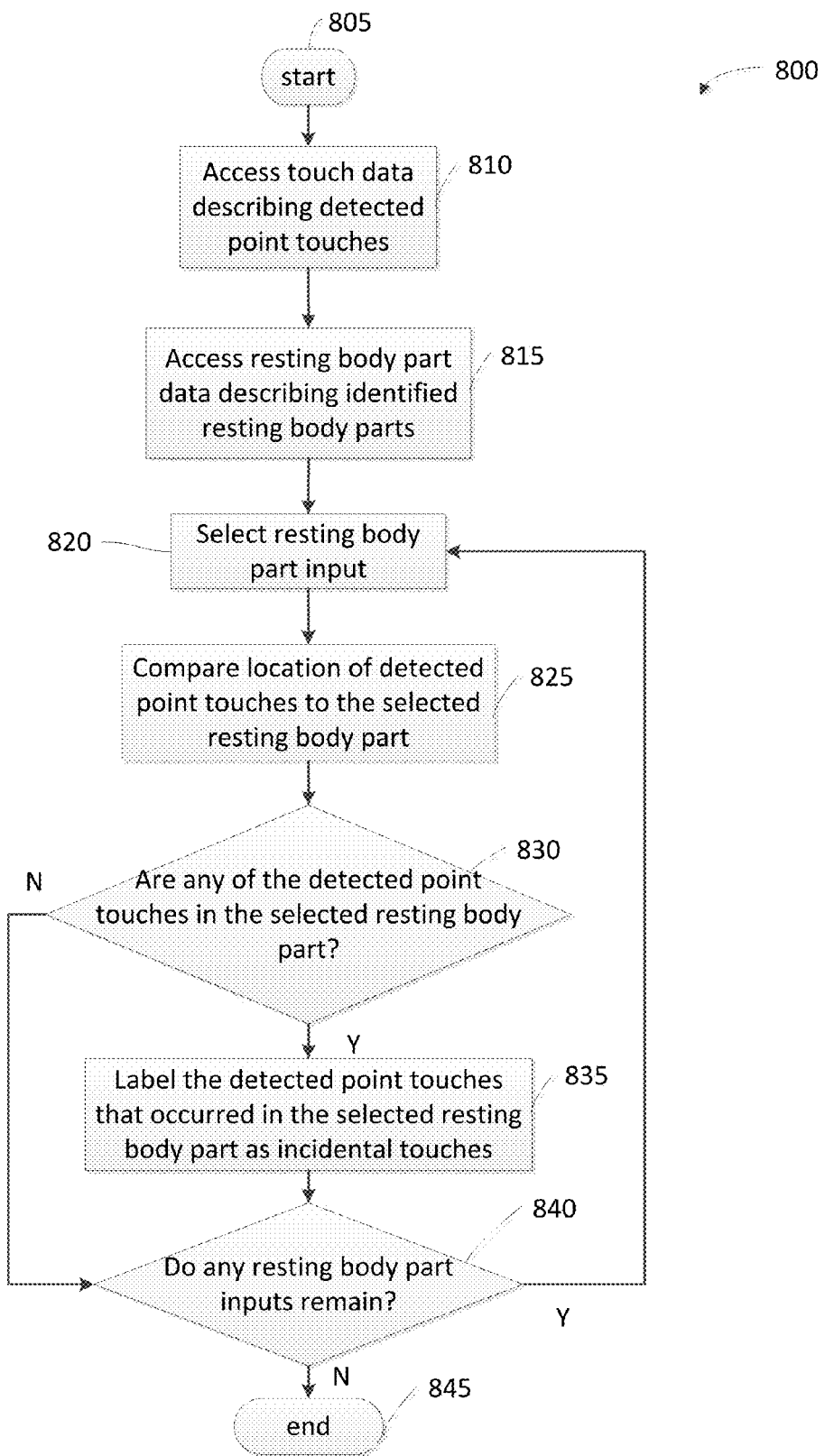
FIG. 8 is a flowchart of an example of the operation of a resting body part contact rejection module.

FIG. 8 illustrates an example process 800 performed by the resting body part contact rejection module 510. The resting body part contact rejection module 510 is configured to label the point touches that occur inside a resting body part as incidental. When the system is analyzing blobs for resting body parts and point touches, the identified resting body parts and point touches sometimes overlap. For example, within a resting body part, the system may identify one or more point touches where the capacitance measured by the sensor peaked compared to the other areas of the resting body part. These touch points should be labeled as incidental by the system because the user did not likely intend for them to interact with the sensor.

The resting body part contact rejection module 510 accesses touch data that describes the detected touch points (810). These touch points are ones that the system has previously identified in the touch detection module 130. The touch points may correspond to locations on the sensor where the user has engaged the sensor with a fingertip or where the user has engaged the sensor with a different point of the user's body, but where the measured capacitance was above a threshold relative to the capacitance measurements surrounding the higher capacitance measurement. For example, the user may have engaged the sensor with the user's wrist to create a dumbbell shape with two capacitive peaks on either end, and the system has previously identified the dumbbell shape as corresponding to two point touches.

The resting body part contact rejection module 510 accesses resting body part data describing contact areas that have been identified as resting body parts (815). As mentioned above, these resting body part regions will typically correspond to palms and arms that the user is resting on the sensor. For example, the dumbbell shape described above may also have been identified previously as a resting body part, and the module 510 can access data that describes the dumbbell contact.

The resting body part contact rejection module 510 selects one of the identified resting body parts (820). For example, the module 510 selects the dumbbell shaped contact. The resting body part contact rejection module 510 compares the location of the identified point touches to the selected resting body part (825). Each of the point touches is compared to the selected resting body part even if the point touches are located closer to other resting body parts. For example, the module compares the center points of the point touches to the area encompassed by the dumbbell shaped resting body part contact. The resting body part rejection module determines if any of the point touches are located inside the selected resting body part (830). For example, the module determines that the center points of two point touches are within the perimeter of the dumbbell shaped resting body part contact.

In some implementations, the system determines that a point touch is located inside the selected resting body part if the point of highest capacitance of the point touch is located inside the resting body part. In other implementations, the system determines that a point touch is located inside the resting body part if the point of highest capacitance is located within a particular threshold of the border of the resting body part. Where the point touch contains a region of high capacitance and not a single point of high capacitance, then, in some examples, the system may determine that the point touch is inside the resting body part if the high capacitance region is entirely inside the resting body part. In other examples, the system may determine that the point touch is inside the resting body part if any portion of the high capacitance region is inside the resting body part. If there are no point touches located in the selected resting body part, then the resting body part contact rejection module 510 does not label any of the touch points as incidental contacts due to positioning within the selected resting body part and determines whether any resting body part inputs remains (840). For example, if the center of the two identified point touches were located outside the perimeter of the dumbbell shaped contact, then the module 510 would maintain the two identified point touches as intended touches and determine whether any resting body part inputs remains.

The point touches that the resting body part rejection module 510 determines to be inside the resting body part are labeled as incidental touches (835). For example, the two point touches that were located inside the dumbbell shape contact are labeled as incidental contacts. In some implementations, the point touches labeled as incidental will be ignored by the system and will not cause the display to react to the point touches labeled as incidental. The resting body part contact rejection module 510 determines if there are any remaining resting body parts that have not been processed (840). If resting body parts remain, then the module returns to stage 820, otherwise module's processing ends (845). For example, if there is a contact that corresponds to a resting arm, then the module will return to select that contact, otherwise, the module's processing is complete.

Figure 9:
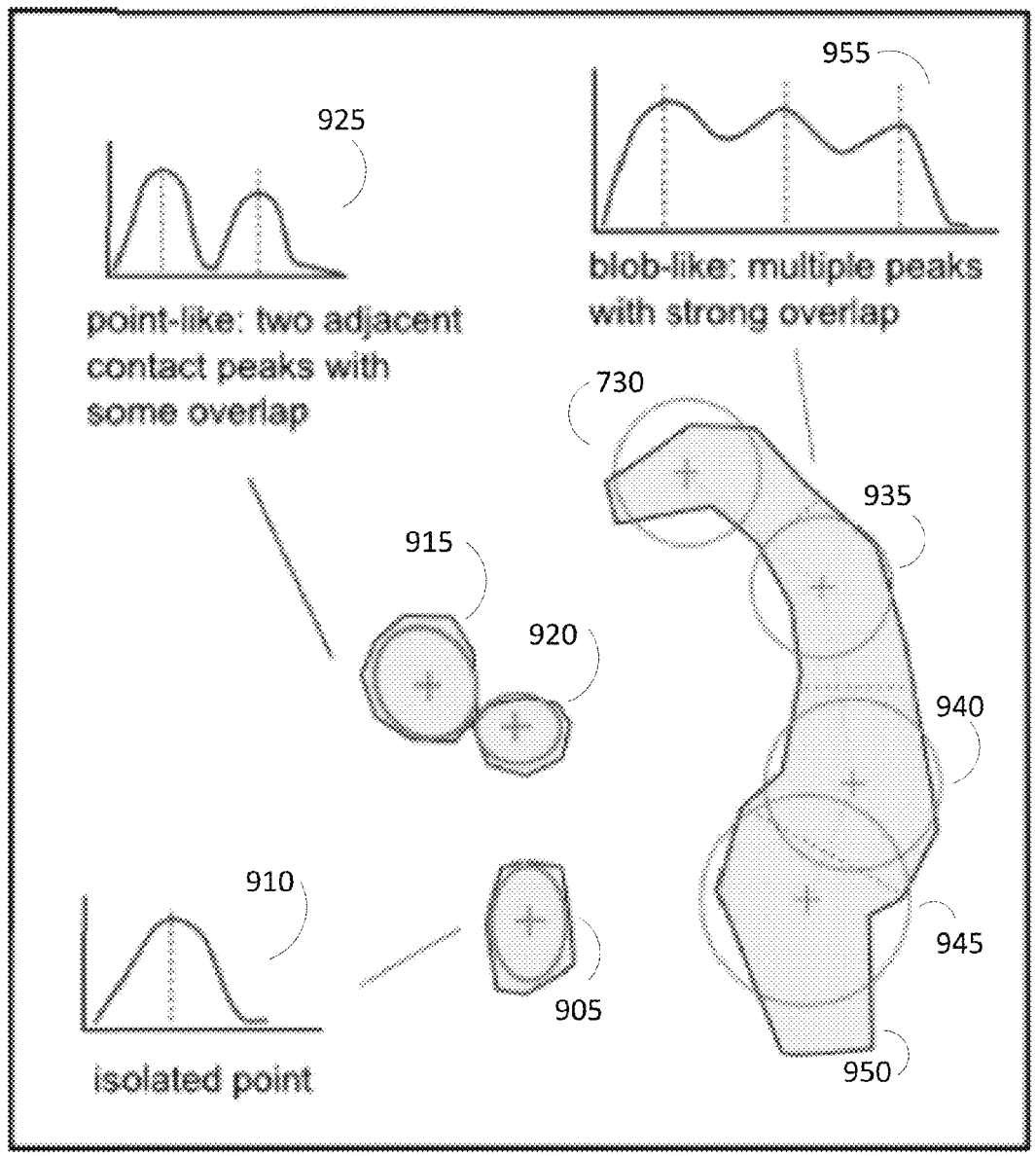
FIG. 9 shows an example resting body part contact with corresponding contacts labeled as incidental.

FIG. 9 shows a resting body part that includes point touches. FIG. 9 shows seven identified point touches. The first point touch 905 is an isolated point. Point touch 905 is likely the product of a single finger engaging the sensor. Graph 910 shows the engagement contour of the point touch 905. Graph 910 shows an increase of measured capacitance at the center of point touch 905 and then a steep drop in the capacitance at the edge of the point touch 905.

The second and third touch points 915 and 920 are point touches that overlap. Point touches 915 and 920 are likely the product of two touching fingers engaging the sensor at the same time. Graph 925 shows the engagement contour of the point touches 915 and 920. Graph 925 shows two peaks where the measured capacitance is highest, The two peaks typically correspond to the center of each point touch. Graph 925 also shows a deep valley between the two peaks, but the valley does not reach zero. There is still some measurable capacitance between the two point touches 915 and 920.

The fourth, fifth, sixth, and seventh touch points 930, 935, 940, and 945 are point touches that may or may not overlap. Point touch 940 and 945 overlap, but point touches 930 and 935 do not overlap. The center point of each point touch is located inside blob 950. Blob 950 is a typical shape created by a user resting the user's palm on the sensor. Given blob 950's eccentricity, area, total capacitance, and perimeter to area ratio, the system labels blob 950 as likely corresponding to a resting body part. Graph 955 shows the engagement contour of the blob 950. Graph 955 shows peaks where each of the point touches 930, 935, 940, and 945 are located within blob 950. Graph 955 also shows shallow valleys separating each of the peaks. The shallow valleys are typically a consequence of a level that a resting body engages the sensor. The level of engagement will typically be even across the entire resting body part with the exception of a few higher points. The point touches 930, 935, 940, and 945 were detected by the touch detection module 130 as potential touches due to the peaks shown in graph 955 and the blob 950 was separately detected as a resting body part by the resting palm and arm identifier 125.

Point touches 905, 915, and 920 are point touches that the resting body part contact rejection module 510 would leave untouched. These point touches would continue to be labeled as point touches. In contrast, point touches 930, 935, 940, and 945 would be labeled as incidental or incorrect by the resting body part contact rejection module 510 because they are located within a resting body part.

Figure 10:
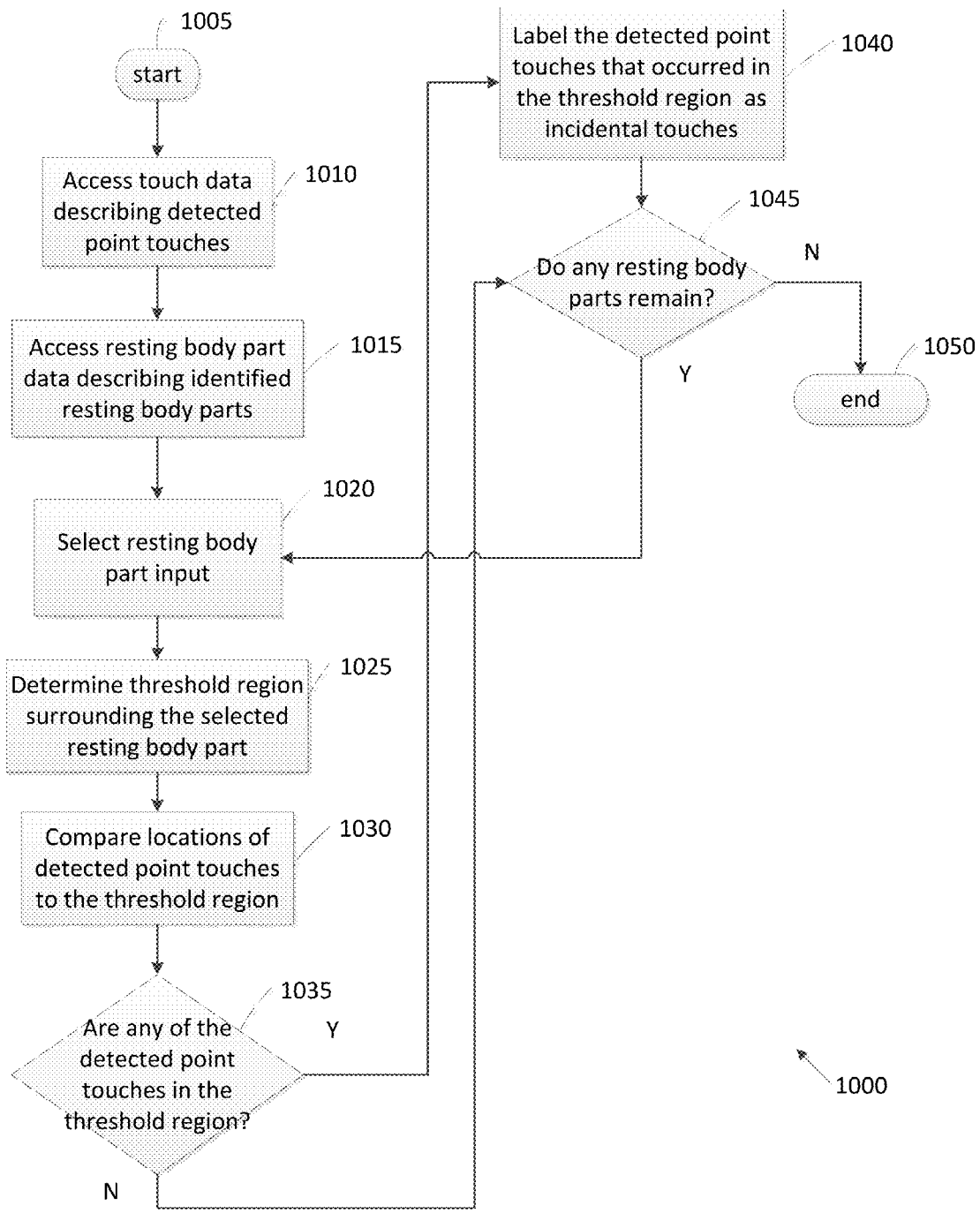
FIG. 10 is a flowchart of an example of the operation of a palm adjacent rejection module.

FIG. 10 illustrates an example process 1000 performed by the palm adjacent point rejection module 515. The palm adjacent point rejection module 515 is designed to label point touches that are located within a threshold of a resting body part as incidental. When a user engages the sensor with a resting body part, for example a palm, any point touches that are located within a particular threshold are likely unintentional. If the user was trying to engage the sensor at a point near a resting body part, then the user would typically move the user's resting body part before engaging the sensor.

The palm adjacent point rejection module 515 begins (1005) and accesses data that describes point touches (1010). For example, the palm adjacent point rejection module 515 accesses data describing three point touches. These are point touches that the system has identified as likely corresponding to intended touches by a user. The module accesses data that describes identified resting body parts (1015). For example, the palm adjacent point rejection module accesses resting body part data that describes a contact area that likely corresponds to a resting palm. The module 515 selects a resting body part for further processing (1020). For example, the palm adjacent point rejection module 515 selects the contact area that likely corresponds to a resting palm.

The palm adjacent point rejection module 515 determines a threshold region that surrounds the resting body part (1025). For example, the module determines a five millimeter distance around the perimeter of the resting palm. In some implementations, the threshold region is a particular distance from the edge of the resting body part, for example, ten millimeters. In other implementations, the threshold region is determined by the measured capacitance of the resting body part. For example, if the peak capacitance for a resting body part is ten femtofarads, and the edge of the resting body part is considered to be where the capacitance drops to two femtofarads, then the threshold region could be the region where the capacitance drops from two to one femtofarads.

The palm adjacent point rejection module 515 compares locations of the point touches to the threshold region (1030). For example, the palm adjacent rejection module compares the location of the center of the three point touches to the five millimeter threshold region around the resting palm region. Based on the comparison, the palm adjacent point rejection module 515 determines whether any of the point touches are located within the threshold region (1035). Based on a determination that one or more of the point touches are located within the threshold region, the palm adjacent point rejection module 515 labels those one or more point touches as incidental (1040). For example, if the center of one of the point touches is located inside the five millimeter threshold, then the module labels it as incidental. If none of the point touches are located within the threshold region, the palm adjacent rejection module 515 determines if any resting body parts remain (1045). For example, if none of the centers of the three point touches were inside the five millimeter threshold, then the module 515 does not label the point touches as incidental. If resting body parts remain, the palm adjacent point rejection module 515 selects a new resting body part to analyze (1020). Otherwise, the module 515 ends processing until new inputs are received (1050). For example, the module 515 may determine that the resting palm contact was the last resting body part and, at that point, the processing for the palm adjacent rejection module 515 would end. To determine whether a point touch is located within the threshold region, the system may use one of several techniques. In some implementations, the system may determine the center point of each point touch and, if the center point is located within the threshold region, determine that the corresponding point touch is incidental. The center point may be the middle of the point touch or the location of highest capacitance for that particular point touch. In other implementations, the system labels the point touch as incidental if the entire point touch is inside the threshold region. In further implementations, the system labels the point touch as incidental if any portion of the point touch is inside the threshold region.

Figure 11:
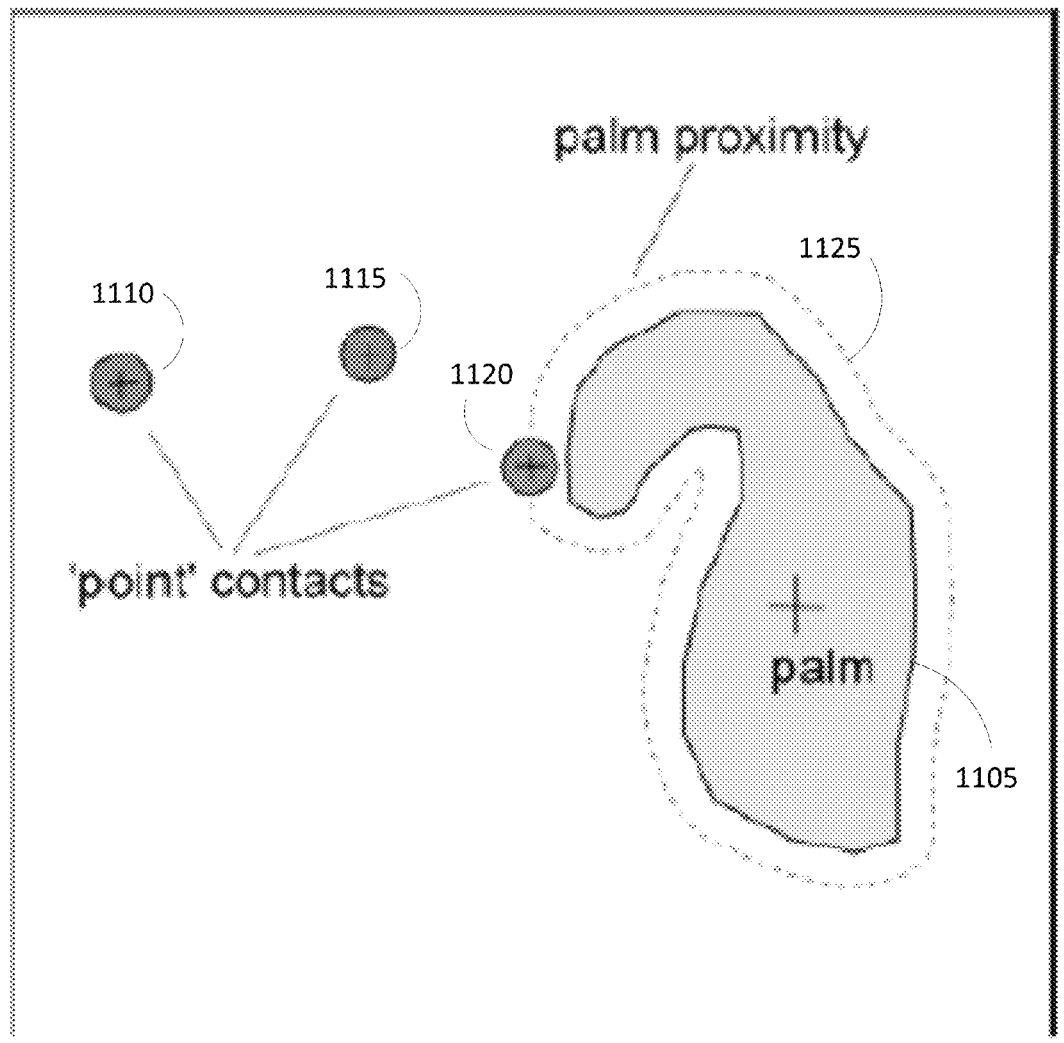
FIG. 11 shows an example palm adjacent region with corresponding contacts labeled as incidental.

FIG. 11 shows an example illustration of a point touch within a threshold of a resting body part. FIG. 11 includes a resting body part 1105. The resting body part 1105 was identified by the resting palm and arm identifier 125. The shape of resting body part 1105 suggests that it corresponds to a resting palm. FIG. 11 includes three point touches 1110, 1115, and 1120. The point touches 1110, 1115, and 1120 were identified by the touch detection module 130. FIG. 11 further includes the threshold region 1125 that surrounds the resting body party 1105.

The threshold region 1125 extends a fixed distance from the edge of the resting body part 1105. In some implementations, the fixed distance is measured in pixels. In other implementations, the fixed distance is measured in millimeters or inches. A portion of point touch 1120 is located within the threshold region 1125. The other point touches 1110 and 1115 both are outside the threshold region 1125. In this example, the palm adjacent rejection module 515 determines that the point touches 1110 and 1115 are completely outside of the threshold region 1125 and that the point touch 1120 is partially located within the threshold region 1125. Based on these determinations, the palm adjacent rejection module 515 labels the touch point 1120 as incidental and maintains the status of point touches 1110 and 1115.

Figure 12:
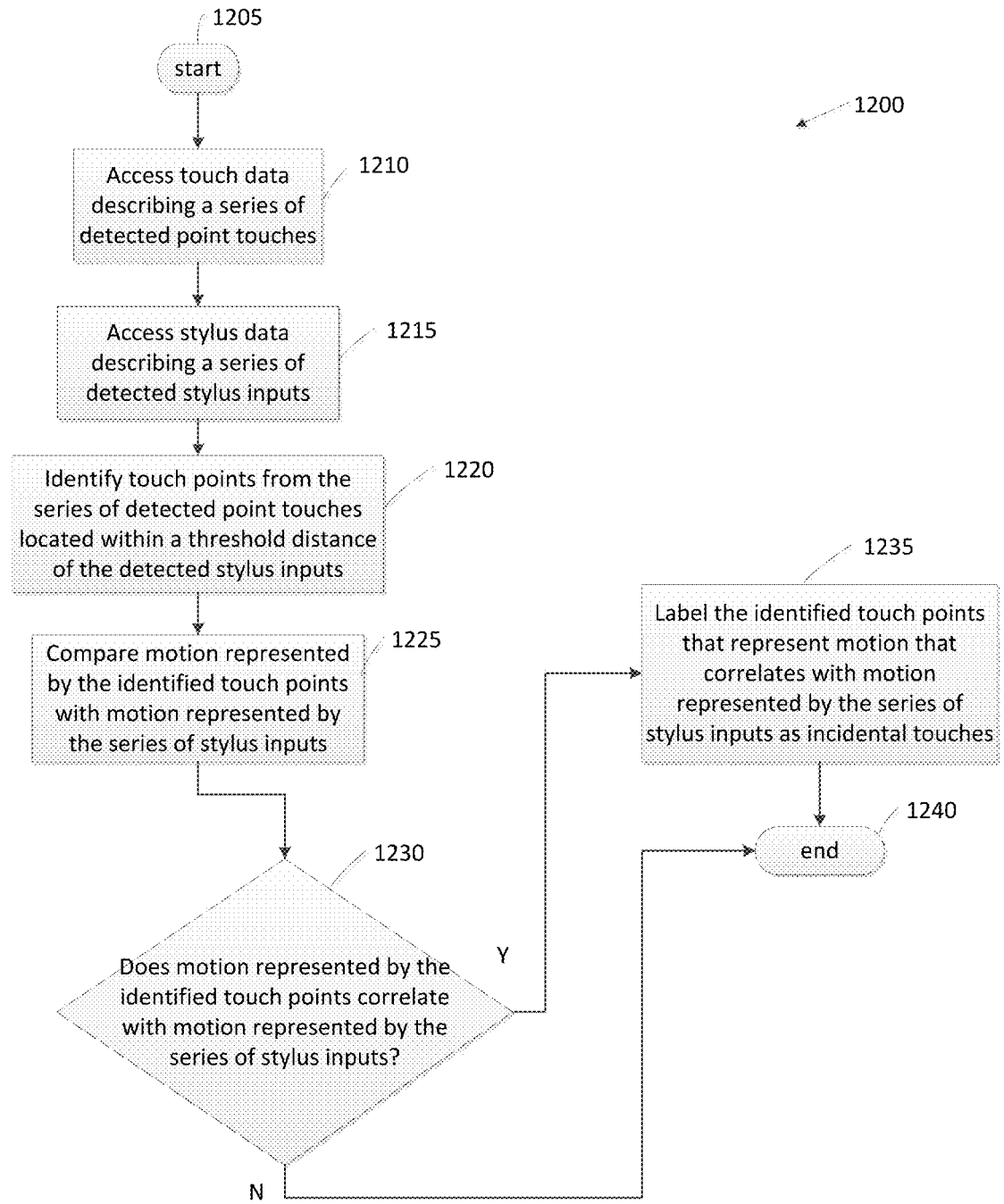
FIG. 12 is a flowchart of an example of the operation of a guide finger rejection module.

FIG. 12 illustrates an example process 1200 performed by the guide point rejection module 520. In some instances a user of the system will engage the sensor 105 with a stylus and in an attempt to write or draw with more precision, the user may drag a guide finger along the sensor while engaging the sensor with the stylus. Typically, the user only wants the stylus to interact with the display on the sensor, not the guide finger. The guide point rejection module 520 identifies a guide finger and classifies the guide finger as incidental input, rather than intended input that the user desires to impact the system.

The guide point rejection module 520 begins (1205) and accesses touch data that describes a series of point touches (1210). For example, the guide point rejection module 520 accesses touch point data for a particular touch point for the previous two seconds. The guide point rejection module 520 also accesses stylus data that describes a series of stylus inputs (1215). For example, the guide point rejection module 520 accesses stylus data for a particular stylus input that is located near the touch point for the previous two seconds. The guide point rejection module 520 identifies touch points from the series of point touches that are within a particular threshold distance from the series of stylus inputs (1220). For example, the guide point rejection module 520 determines that the series of point touches and the series of stylus inputs are within six centimeters of each other and the threshold is ten centimeters. In general, when the sensor collects data, it collects data at regular intervals, for example, every millisecond. When a user is using a guide finger, each frame of data gathered by the sensor will contain a stylus input and a point touch. The guide point rejection module 520 examines multiple frames from the sensor. In some implementations, if one frame contains the stylus input within a threshold distance of a point touch, then the guide point rejection module 520 may compare the motion of the entire series of stylus inputs and touch points. In other implementations, the system may require that a particular number of frames where the stylus inputs are within a threshold distance of the touch points.

The guide point rejection module 520 compares the motion represented by the identified touch points with the motion represented by the series of stylus inputs (1225) and, based on the comparison, determines whether the motion represented by the identified touch points correlates sufficiently with the motion represented by the series of stylus inputs (1230). If the guide point rejection module 520 determines that the motion correlates sufficiently, then the series of touch points are labeled as incidental touches (1235). Otherwise, the process ends (1240). To determine if the motion of the series of stylus inputs correlates with the motion of the identified touch points, the guide point rejection module 520 may compute the distance between the touch point and the stylus inputs for each frame. If each computed distance remains within a range, for example, all distances are in a ten millimeter range and the motions are substantially parallel, then the guide point rejection module 520 determines that the identified touch points are from a guide finger and thus incidental. For example, the guide point rejection module 520 extrapolates a line created by the series of point touches and the series of stylus inputs. If the two lines are substantially parallel, then the guide point rejection module 520 labels the series of point touches as incidental. In some implementations, the distance range between the identified touch points and the stylus inputs is converted to a score. If the score is above or below a particular threshold, then the touch points are labeled incidental. In other implementations, the guide point rejection module 520 determines the cross-correlation of the identified touch points and the stylus inputs. For example, the guide point rejection module 520 determines a mathematical function that describes the path of the identified touch points and the stylus inputs. The guide point rejection module 520 then determines the cross-correlation of the two functions. If the cross-correlation is higher or lower than a particular threshold, then the touch points are labeled incidental.

Figure 13A:
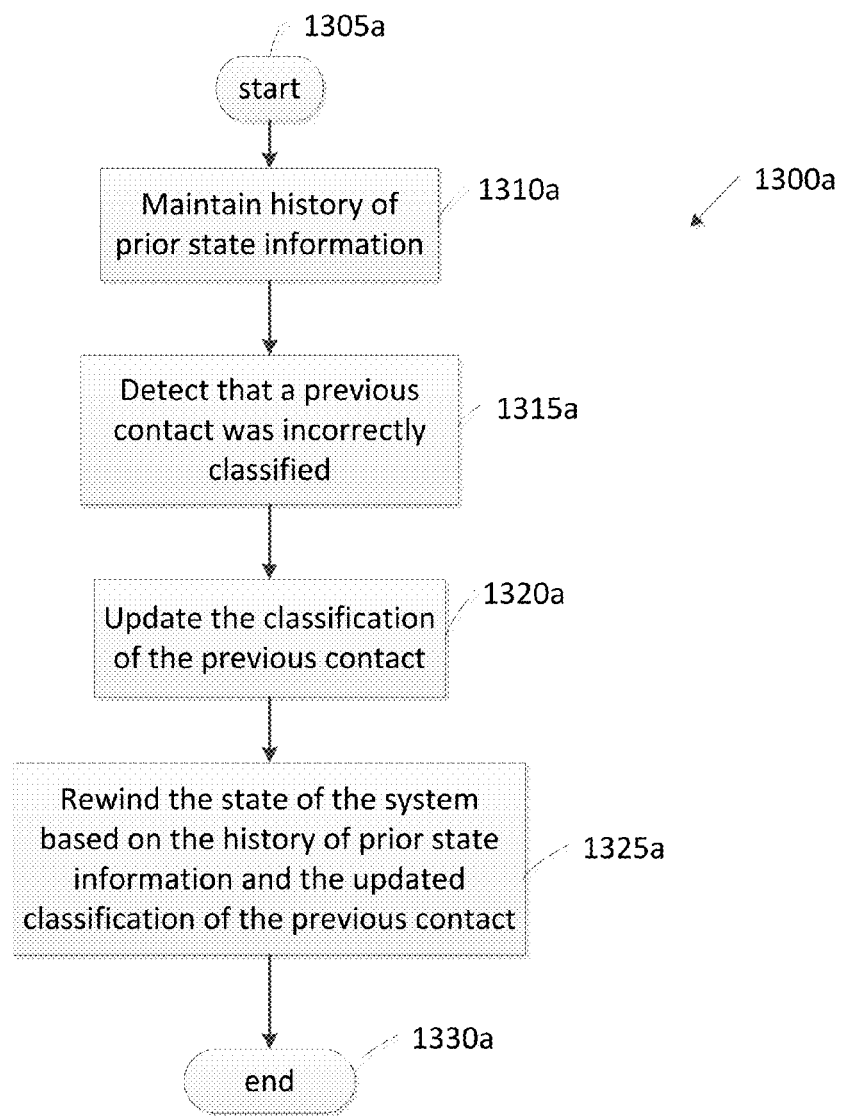
FIG. 13A is a flowchart of an example of an overview of the operation of a state rewind process.

FIG. 13A illustrates an example process 1300*a* of a state rewind procedure performed by the system 100. In some instances, the system 100 may identify a blob as a point touch. Once this blob evolves, the system may change the classification of the blob to a resting body part. Upon reclassification of the blob, the system 100 rewinds or reverses the operations performed by the point touch. In other instances, the system 100 may identify a blob as a resting body part. Once this blob evolves, the system 100 may change the classification of the blob to a point touch. Upon reclassification of the blob, the system performs the operations that would have been performed by the point touch had it originally been identified as a point touch, instead of being classified as an incidental touch of a resting body part.

The system 100 starts the state rewind procedure 1300*a* (1305*a*) and maintains a history of prior state information (1310*a*). The state information may include the detected blobs, the classification of each blob, and any action that the blob performed on the display. The system 100 may store the state information for either a particular number of seconds or frames. For example, the system 100 may save the previous thirty seconds worth of inputs and display manipulations. Once the system 100 fills the particular number of state information entries, then the system 100 may replace the oldest state information frame with the most recent state information frame.

The system 100 detects that a previous contact was incorrectly classified (1315*a*). For example, a contact, or blob, may have been classified as a resting body part, then in subsequent frames the blob may have been classified as a point touch. To determine the change in classification, the system 100 identifies a blob as either a point touch or as a resting body part. The system 100 examines the previous frame to determine if a blob was located in substantially the same location as the current frame. If the blob was in substantially the same location, then the system 100 recalls the classification of the blob and determines whether the blob should be reclassified. If the classification of the blob was different in the previous frame than in the current frame, the system 100 reclassifies the blob (1320*a*). For example, if a contact was originally classified as incidental and that classification was determined to be incorrect, then the classification may be updated to intentional.

The system 100 rewinds the state of the system 100 based on the history of the prior state information and the updated classification of the previous contact, or blob (1325*a*). For a particular number of frames, the system 100 reviews the history of the blob and the actions performed by the blob. With the updated classification, the system determines what actions the blob should have performed or should have not performed. The system 100 performs the actions of the touch inputs where the blob should have been classified as point touch and the system 100 reverses the actions taken for the blob being classified as a touch point when the blob should have been classified as a resting body part or incidental contacts. For example, if a contact that was originally classified as intentional resulted in movement of an object on the display and the contact is reclassified as incidental, then the object may be moved back to its original position.

Figure 13B:
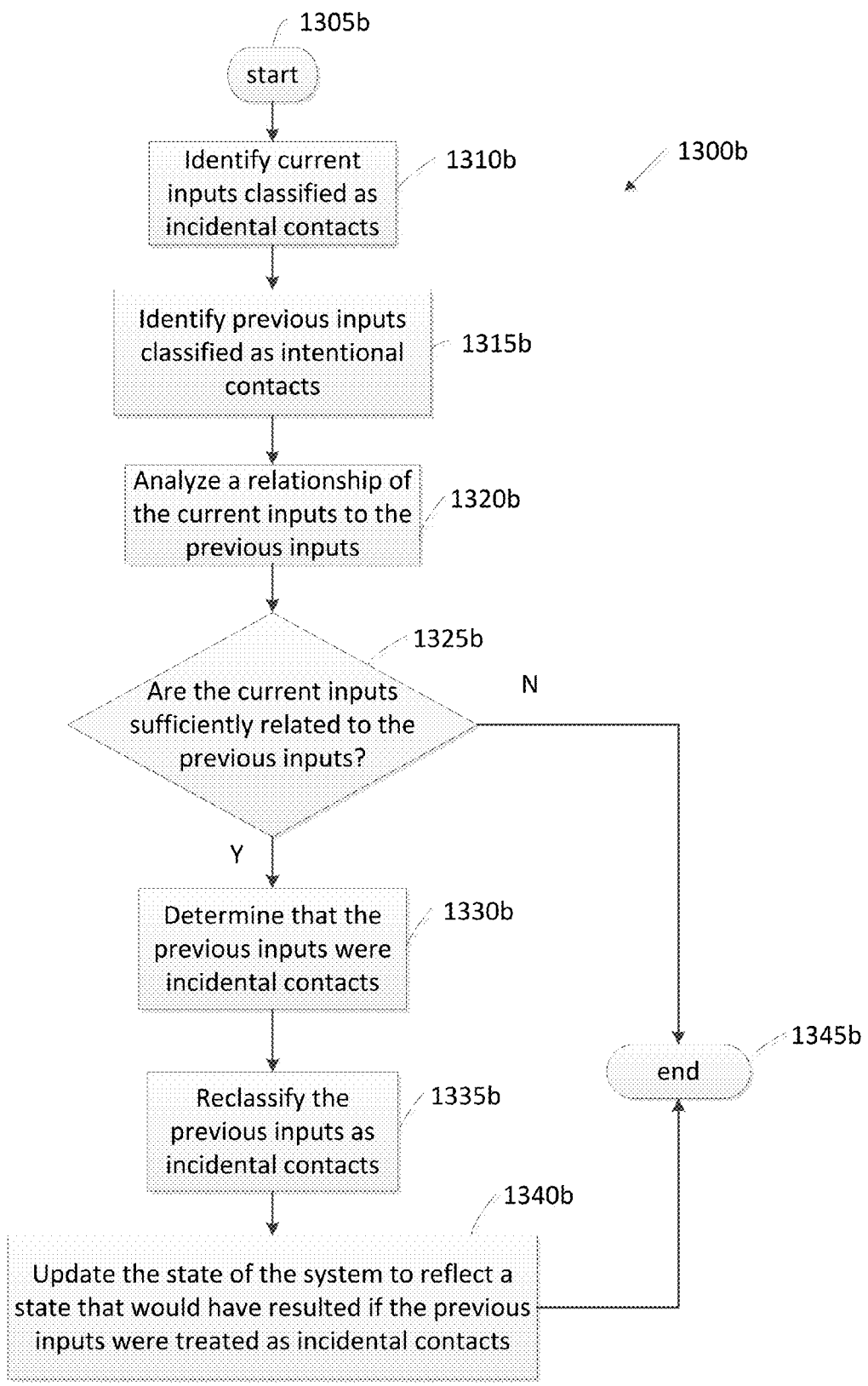
FIG. 13B is a flowchart of an example of the operation of a state rewind process where a contact is reclassified as an incidental contact.

FIG. 13B illustrates an example process 1300*b* performed by the system 100 when rewinding the state of the system 100 to account for a blob originally classified as a touch point and later reclassified as an incidental contact. The system 100 begins (1305*b*) and identifies current inputs that are classified as incidental contacts (1310*b*). The current inputs are those inputs that have most recently occurred (e.g., occurred in the most recent frame). For example, the system 100 identifies an incidental contact in the most recent frame. The system 100 identifies the previous inputs that have been classified as intentional contacts (1315*b*). In some implementations, the system 100 identifies the previous inputs that have been classified as intentional contacts by analyzing a particular number of previous frames, for example, ten frames. In some implementations, the system 100 identifies the previous inputs that have been classified as intentional contacts by analyzing a particular number of previous seconds worth of frames, for example, the frames from the previous two seconds. In these implementations, the system 100 identifies the intentional contacts from the previous five seconds of frames.

The system 100 analyzes the relationship between the identified previous intentional contacts and the current incidental contacts (1320*b*). For example, the system 100 examines the patterns of the intentional contacts and the incidental contacts to determine if they are related to the same touch sequence. The system 100 determines whether any of the current incidental inputs are sufficiently related to the previous intentional inputs (1325*b*). For example, if the system 100 determines that the intentional contacts and the incidental contacts are from the same touch sequence, the system 100 determines that a sufficient relationship exists. If the system 100 determines that a sufficient relationship does not exist, the method 1300*b* ends (1345*b*) and the system 100 does not reclassify any of the contacts. In some implementations, to determine if any of the current incidental inputs are sufficiently related to the previous intentional inputs, the system 100 may examine the location of the inputs. If a current incidental input is within a particular radius of one or more previous intentional inputs, for example, two millimeters, then the system 100 determines that a sufficient relationship exists. In some examples, the system 100 examines the path created by the previous intentional inputs and determines whether the current incidental input follows the same path as extrapolated from the path created by the previous inputs. If the current incidental input follows the same path as extrapolated from the previous inputs within a threshold, then the system 100 determines that a sufficient relationship exists. In other implementations, the system 100 examines the perimeter of the previous intentional inputs and determines whether that the current incidental input fits a perimeter that has evolved from the previous perimeter. Based on a determination that the current incidental input fits a perimeter that has evolved from the previous perimeter, the system 100 determines that a sufficient relationship exists.

If the system 100 determines that a sufficient relationship between the current inputs and the previous inputs exists, then the system 100 determines that the previous inputs are incidental contacts (1330*b*) and reclassifies the previous inputs as incidental contacts (1335*b*). For example, the intentional contacts from the previous inputs are determined to be incidental contacts, rather than intended touches, and are reclassified accordingly. The system 100 updates the state of the system 100 to reflect a state that would have resulted if the previous inputs were treated as incidental contacts. For example, if the previous contacts performed an action on the display of the sensor, then the actions will be undone. Actions may include moving an object, resizing an object, zooming an object, writing, or any other action that a user may perform on the display of the sensor. The actions are undone, the state of the system is rewound, and the method 1300*b* ends (1345*b*).

Figure 13C:
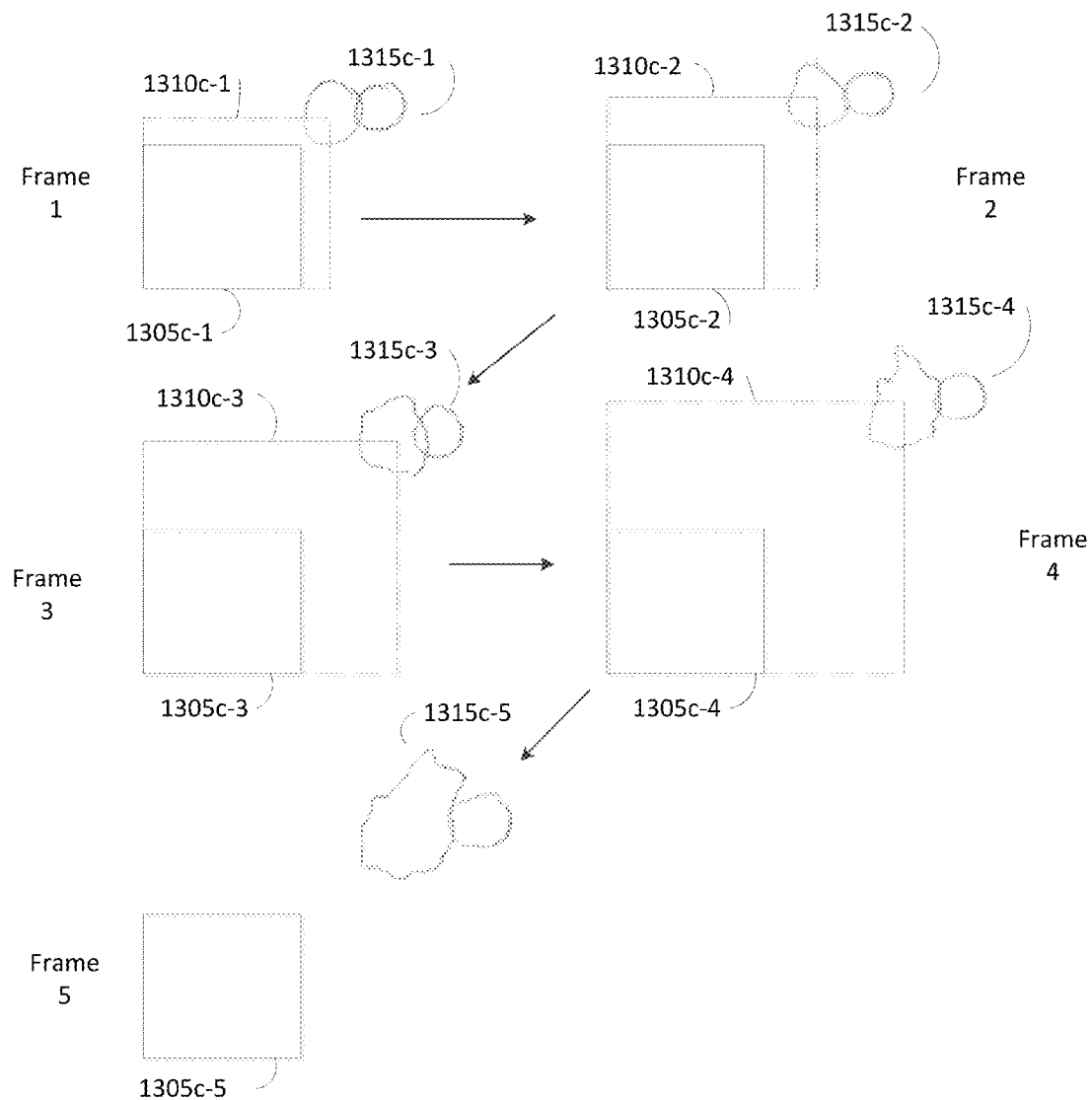
FIG. 13C shows an example contact being reclassified as an incidental contact and the resulting system state updates.

FIG. 13C shows an input that is reclassified from an intentional contact to an incidental contact. FIG. 13C shows five frames one to five of input. In the first four frames one to four an object is expanded in an outline or ghost form based on the input provided. In frame five, the object is returned to its original state because the input that expanded the object is reclassified as an incidental contact and a cancellation event for the previous intentional touch detections is performed. In frame one, object 1305*c*-1 is initially expanded to object 1310*c*-1 in an outline or ghost format because of input 1315*c*-1. At frame one, input 1315*c*-1 is classified as an intentional input with a low confidence score because it is determined by the system 100 to be a point touch, but with a relatively low confidence level. At frames two to five, object 1305*c* is continuously expanded in outline or ghost form as objects 1310*c*-2, 1310*c*-3, and 1310*c*-4 by inputs 1315*c*-2, 1315*c*-3, and 1315*c*-4, respectively, which are all classified as low confidence touches. At frame five, input 1315*c*-5 is classified as an incidental contact. Because previously, in frames one to four, the input was classified as an intentional contact, object 1305*c* continued to expand, despite the low confidence score. In frame five, object 1315*c*-5 is classified as an incidental contact and, because of that classification, the previous low confidence contacts are reclassified as incidental contacts (e.g., cancelled by a cancellation message generated when the object 1315*c*-5 is classified as an incidental contact. The expanding of object 1305*c* that contact 1315*c* performed is undone and returned the object 1305*c* is returned to its original state in frame five.

Figure 13D:
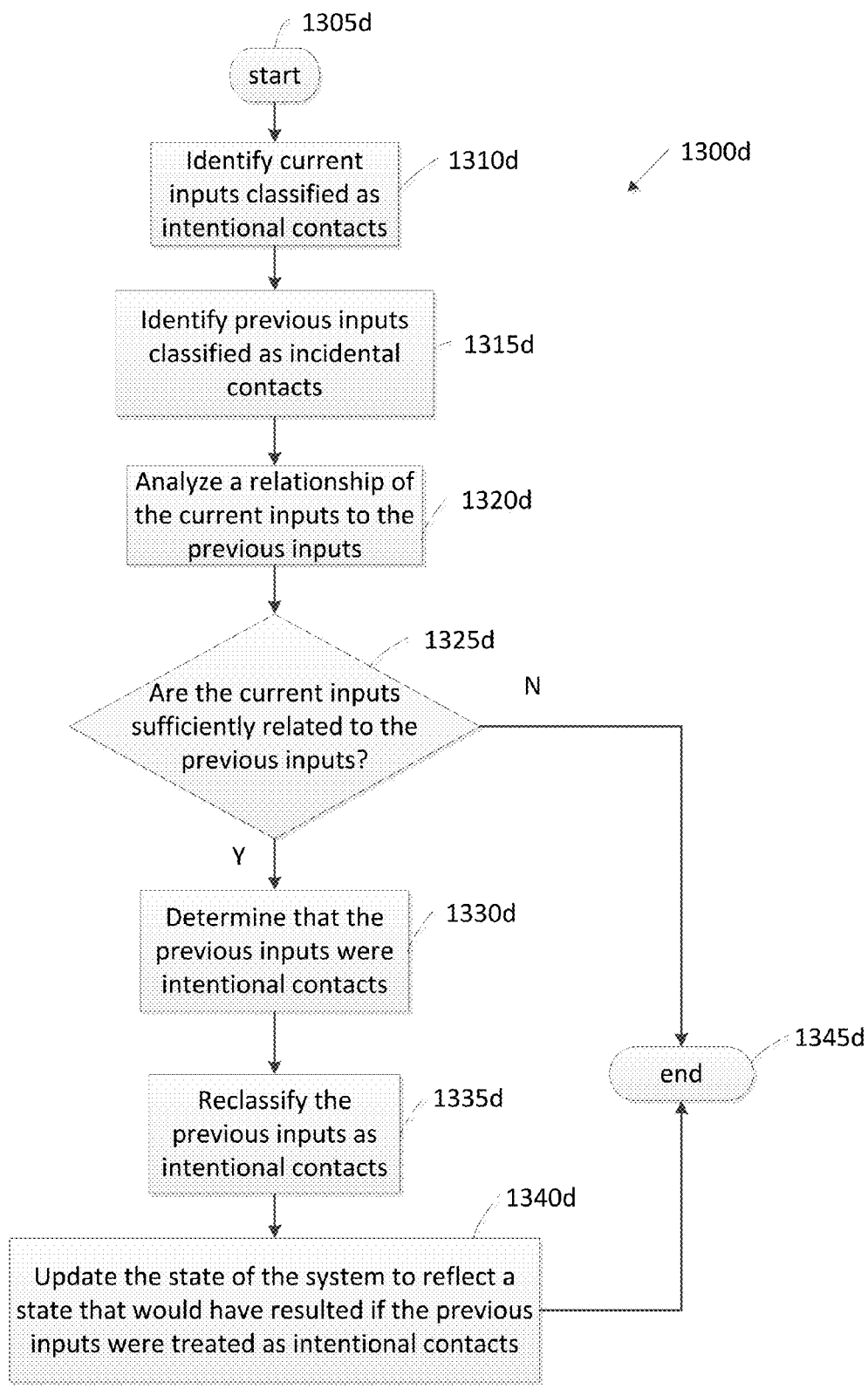
FIG. 13D is a flowchart of an example of the operation of a state rewind process where a contact is reclassified as an intentional contact.

FIG. 13D illustrates an example process 1300d performed by the system 100 when rewinding the state of the system 100 to account for a blob being reclassified from an incidental contact to an intentional contact. The system 100 begins (1305d) and identifies current inputs that are classified as intentional contacts (1310b). The current inputs are those inputs that have most recently occurred (e.g., occurred in the most recent frame). For example, the system 100 identifies an intentional contact in the most recent frame. The system 100 identifies the previous inputs that have been classified as incidental contacts (1315d). In some implementations, the system 100 identifies the previous inputs that have been classified as incidental contacts by analyzing a particular number of previous frames, for example, ten frames. In some implementations, the system 100 identifies the previous inputs that have been classified as incidental contacts by analyzing a particular number of previous seconds worth of frames, for example, the frames from the previous two seconds. In these implementations, the system 100 identifies the incidental contacts from the previous five seconds of frames.

The system 100 analyzes the relationship between the identified previous incidental contacts and the current intentional contacts (1320d). For example, the system 100 examines the patterns of the incidental contacts and the intentional contacts to determine if they are related to the same touch sequence. The system 100 determines whether any of the current intentional inputs are sufficiently related to the previous incidental inputs (1325d). For example, if the system 100 determines that the incidental contacts and the intentional contacts are from the same touch sequence, the system 100 determines that a sufficient relationship exists. If the system 100 determines that a sufficient relationship does not exist, the method 1300d ends (1345d) and the system 100 does not reclassify any of the contacts. In some implementations, to determine if any of the current intentional inputs are sufficiently related to the previous incidental inputs, the system 100 may examine the location of the inputs. If a current intentional input is within a particular radius of one or more previous incidental inputs, for example, two millimeters, then the system 100 determines that a sufficient relationship exists. In some examples, the system 100 examines the path created by the previous incidental inputs and determines whether the current intentional input follows the same path as extrapolated from the path created by the previous inputs. If the current intentional input follows the same path as extrapolated from the previous inputs within a threshold, then the system 100 determines that a sufficient relationship exists. In some implementations, the system 100 examines the perimeter of the previous incidental inputs and determines whether the current intentional input contains a perimeter that has evolved from the previous perimeter. Based on a determination that the current intentional input fits a perimeter that has evolved from the previous perimeter, the system 100 determines that a sufficient relationship exists.

If there is a sufficient relationship between the current inputs and the previous inputs, then the system 100 determines that the previous inputs are intentional contacts (1330d) and the system 100 reclassifies the previous inputs as intentional contacts (1335d). For example, the intentional contacts are determined to be incidental contacts and are reclassified accordingly. The system 100 updates the state of the system to reflect a state that would have resulted if the previous inputs were treated as intentional contacts. For example, if the previous contacts would have performed an action on the display of the sensor if the previous contacts were intentional contacts, then the action will be completed. Actions may include moving an object, resizing an object, zooming on an object, writing, or any other action that a user may perform on the display of the sensor. The actions are completed and the method 1300d ends (1345d).

Figure 13E:
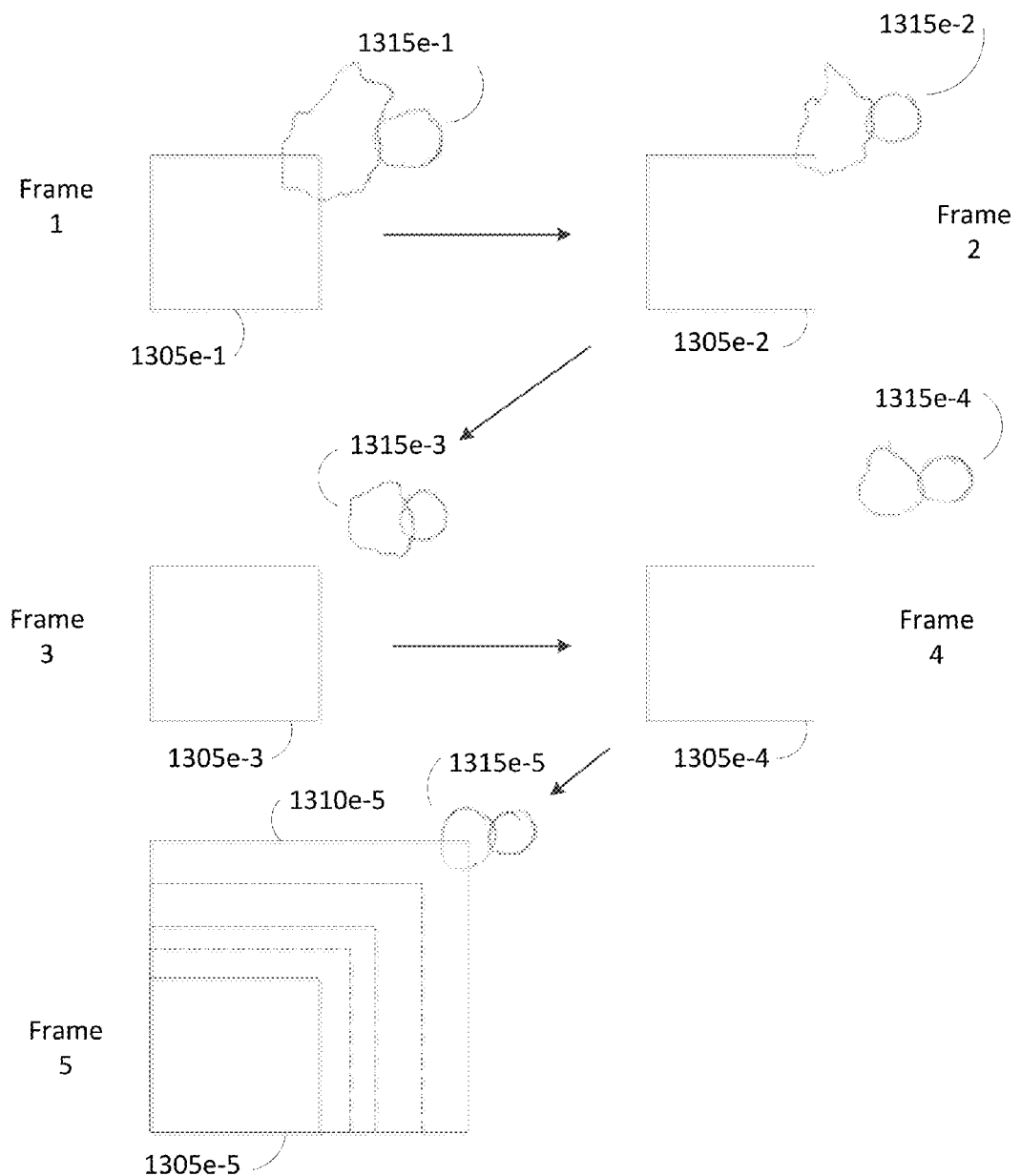
FIG. 13E shows an example contact being reclassified as an intentional contact and the resulting system state updates.

FIG. 13E shows an input that is reclassified from an incidental contact to an intentional contact. FIG. 13E shows five frames one to five of input. In the first four frames one to four, an object 1305e remains unchanged even with inputs of 1315e-1, 1315e-2, 1315-3, and 1513-4 nearby. In frame five, the object 1305e-5 is changed to a state reflected by object 1310e-5 that it would have resulted had the previous inputs been classified as intentional contacts. In frames one to four, object 1305e is unchanged by input 1315e because it is classified as an incidental input. At frame five, input 1315e-5 is classified as an intentional contact. Because previously in frames one to four, the input 1315e was classified as an incidental contact and the object 1305e remained unchanged. In frame five, object 1315e-5 is classified as an intentional contact and, because of that classification, the previous contacts of contact 1315e-1 to 1315e-4 are reclassified as intentional contacts. The expanding of object 1305e-5 to object 1310e-5 in frame five is performed based on the path of the previous inputs 1315e from frames one to four and is performed with animation such that the user is able to perceive the correction more easily than if the object 1305e-5 snapped to a size of the object 1310e-5. Object 1310e-5 reflects the state of the object that would have occurred after frames one to four had input provided at 1315e been classified as an intentional contact.

What is claimed is:

1. A computer implemented method, comprising:
receiving data describing a first region of contact with a touch sensitive display and a second region of contact with the touch sensitive display;
determining at least one characteristic of the first region of contact;
based on the at least one characteristic of the first region of contact, determining that the first region of contact corresponds to intended touch input provided by a user's body part or stylus;
determining at least one characteristic of the second region of contact;
based on the at least one characteristic of the second region of contact, determining that the second region of contact corresponds to incidental touch input provided by a user's resting body part comprising:
determining a perimeter corresponding to the second region of contact:
determining an area corresponding to the second region of contact;
determining a ratio of the determined perimeter to the determined area;
comparing the determined ratio to a threshold;
based on comparing the determined ratio to the threshold, determining that the determined ratio is greater than the threshold;
based on the determination that the determined ratio is greater than the threshold, determining that the second region of contact corresponds to incidental touch input; and
based on the determination that the first region of contact corresponds to intended touch input and the second region of contact corresponds to incidental touch input, updating the touch sensitive display by responding to the first region of contact as touch input while ignoring the second region of contact.

2. The method of claim 1:
wherein determining the at least one characteristic of the first region of contact comprises determining a first area of the first region of contact;
wherein determining that the first region of contact corresponds to intended touch input comprises determining that the first region of contact corresponds to intended touch input based on the first area of the first region of contact;
wherein determining the at least one characteristic of the second region of contact comprises determining a second area of the second region of contact; and
wherein determining that the second region of contact corresponds to incidental touch input comprises determining that the second region of contact corresponds to incidental touch input based on the second area of the second region of contact.

3. The method of claim 2:
wherein determining that the first region of contact corresponds to intended touch input based on the first area of the first region of contact comprises:
comparing the first area of the first contact region to a threshold;
based on comparing the first area of the first contact region to the threshold, determining that the first area is less than the threshold; and
based on the determination that the first area is less than the threshold, determining that the first region of contact corresponds to intended touch input; and
wherein determining that the second region of contact corresponds to incidental touch input based on the second area of the second region of contact comprises:
comparing the second area of the second contact region to the threshold;
based on comparing the second area of the second contact region to the threshold, determining that the second area is greater than the threshold; and
based on the determination that the second area is greater than the threshold, determining that the second region of contact corresponds to incidental touch input.

4. The method of claim 1:
wherein determining the at least one characteristic of the second region of contact comprises determining an ellipse that surrounds the second region of contact, the ellipse having a major axis and a minor axis; and
wherein determining that the second region of contact corresponds to incidental touch input comprises determining that the second region of contact corresponds to incidental touch input based on the determined ellipse.

5. The method of claim 4, wherein determining that the second region of contact corresponds to incidental touch input based on the determined ellipse comprises:
determining a ratio of the major axis of the ellipse to the minor axis of the ellipse;
comparing the determined ratio to a threshold;
based on comparing the determined ratio to the threshold, determining that the determined ratio is greater than the threshold; and
based on the determination that the determined ratio is greater than the threshold, determining that the second region of contact corresponds to incidental touch input.

6. The method of claim 1, wherein determining that the second region of contact corresponds to incidental touch input comprises:
determining an area of the second region of contact;
determining an ellipse that surrounds the second region of contact, the ellipse having a major axis and a minor axis;
determining a first ratio of the major axis of the ellipse to the minor axis of the ellipse;
determining a total capacitance corresponding to the second region of contact; and
determining that the second region of contact corresponds to incidental touch input based on the determined area of the second region of contact, the first ratio of the major axis of the ellipse to the minor axis of the ellipse, and the total capacitance corresponding to the second region of contact.

7. The method of claim 1:
wherein determining the at least one characteristic of the second region of contact comprises determining a capacitance corresponding to the second region of contact; and
wherein determining that the second region of contact corresponds to incidental touch input comprises determining that the second region of contact corresponds to incidental touch input based on the determined capacitance.

8. The method of claim 7, wherein determining that the second region of contact corresponds to incidental touch input based on the determined capacitance comprises:
comparing the determined capacitance of the second contact region to a threshold;
based on comparing the determined capacitance of the second contact region to the threshold, determining that the capacitance is greater than the threshold; and
based on the determination that the capacitance is greater than the threshold, determining that the second region of contact corresponds to incidental touch input.

9. A system comprising:
one or more computers configured to perform operations comprising:
receiving data describing a first region of contact with a touch sensitive display and a second region of contact with the touch sensitive display;
determining at least one characteristic of the first region of contact;
based on the at least one characteristic of the first region of contact, determining that the first region of contact corresponds to intended touch input provided by a user's body part or stylus;
determining at least one characteristic of the second region of contact;
based on the at least one characteristic of the second region of contact, determining that the second region of contact corresponds to incidental touch input provided by a user's resting body part comprising:
determining a perimeter corresponding to the second region of contact:
determining an area corresponding to the second region of contact:
determining a ratio of the determined perimeter to the determined area;
comparing the determined ratio to a threshold;
based on comparing the determined ratio to the threshold, determining that the determined ratio is greater than the threshold;
based on the determination that the determined ratio is greater than the threshold, determining that the second region of contact corresponds to incidental touch input; and based on the determination that the first region of contact corresponds to intended touch input and the second region of contact corresponds to incidental touch input, updating the touch sensitive display by responding to the first region of contact as touch input while ignoring the second region of contact.

10. The system of claim 9:
wherein determining the at least one characteristic of the first region of contact comprises determining a first area of the first region of contact;
wherein determining that the first region of contact corresponds to intended touch input comprises determining that the first region of contact corresponds to intended touch input based on the first area of the first region of contact;
wherein determining the at least one characteristic of the second region of contact comprises determining a second area of the second region of contact; and
wherein determining that the second region of contact corresponds to incidental touch input comprises determining that the second region of contact corresponds to incidental touch input based on the second area of the second region of contact.

11. The system of claim 10:
wherein determining that the first region of contact corresponds to intended touch input based on the first area of the first region of contact comprises:
    comparing the first area of the first contact region to a threshold;
    based on comparing the first area of the first contact region to the threshold, determining that the first area is less than the threshold; and
    based on the determination that the first area is less than the threshold, determining that the first region of contact corresponds to intended touch input; and
wherein determining that the second region of contact corresponds to incidental touch input based on the second area of the second region of contact comprises:
    comparing the second area of the second contact region to the threshold;
    based on comparing the second area of the second contact region to the threshold, determining that the second area is greater than the threshold; and
    based on the determination that the second area is greater than the threshold, determining that the second region of contact corresponds to incidental touch input.

12. The system of claim 9:
wherein determining the at least one characteristic of the second region of contact comprises determining an ellipse that surrounds the second region of contact, the ellipse having a major axis and a minor axis; and
wherein determining that the second region of contact corresponds to incidental touch input comprises determining that the second region of contact corresponds to incidental touch input based on the determined ellipse.

13. The system of claim 12, wherein determining that the second region of contact corresponds to incidental touch input based on the determined ellipse comprises:
    determining a ratio of the major axis of the ellipse to the minor axis of the ellipse;
    comparing the determined ratio to a threshold; based on comparing the determined ratio to the threshold, determining that the determined ratio is greater than the threshold; and
    based on the determination that the determined ratio is greater than the threshold, determining that the second region of contact corresponds to incidental touch input.

14. The system of claim 9, wherein determining that the second region of contact corresponds to incidental touch input comprises:
    determining an area of the second region of contact;
    determining an ellipse that surrounds the second region of contact, the ellipse having a major axis and a minor axis;
    determining a first ratio of the major axis of the ellipse to the minor axis of the ellipse;
    determining a total capacitance corresponding to the second region of contact; and
    determining that the second region of contact corresponds to incidental touch input based on the determined area of the second region of contact, the first ratio of the major axis of the ellipse to the minor axis of the ellipse, and the total capacitance corresponding to the second region of contact.

15. The system of claim 9:
wherein determining the at least one characteristic of the second region of contact comprises determining a capacitance corresponding to the second region of contact; and
wherein determining that the second region of contact corresponds to incidental touch input comprises determining that the second region of contact corresponds to incidental touch input based on the determined capacitance.

16. The system of claim 15, wherein determining that the second region of contact corresponds to incidental touch input based on the determined capacitance comprises:
    comparing the determined capacitance of the second contact region to a threshold;
    based on comparing the determined capacitance of the second contact region to the threshold, determining that the capacitance is greater than the threshold; and
    based on the determination that the capacitance is greater than the threshold, determining that the second region of contact corresponds to incidental touch input.

* * * * *